US012695169B2

(12) United States Patent
Kim et al.

(10) Patent No.: US 12,695,169 B2
(45) Date of Patent: Jul. 28, 2026

(54) SMALL CELL BASE STATION ANTENNA APPARATUS

(71) Applicant: KMW INC., Hwaseong-si (KR)

(72) Inventors: Duk Yong Kim, Yongin-si (KR); Bae Mook Jeong, Suwon-si (KR); Seong Min Ahn, Namyangju-si (KR); Ki Hun Park, Hwaseong-si (KR); Kyo Sung Ji, Hwaseong-si (KR); Chi Back Ryu, Hwaseong-si (KR); Won Jun Park, Yongin-si (KR); Min Sik Park, Hwaseong-si (KR); Hyoung Seok Yang, Hwaseong-si (KR); Yong Sang Lee, Yongin-si (KR); Sung Hwan So, Hwaseong-si (KR); Yong Won Seo, Daejeon (KR); In Ho Kim, Yongin-si (KR); Hee Kim, Osan-si (KR)

(73) Assignee: KMW INC., Hwaseong-si (KR)

( * ) Notice: Subject to any disclaimer, the term of this patent is extended or adjusted under 35 U.S.C. 154(b) by 14 days.

(21) Appl. No.: 18/781,984

(22) Filed: Jul. 23, 2024

(65) Prior Publication Data

US 2024/0380110 A1      Nov. 14, 2024

Related U.S. Application Data

(63) Continuation of application No. PCT/KR2023/001011, filed on Jan. 20, 2023.

(30) Foreign Application Priority Data

Jan. 25, 2022   (KR) ........................ 10-2022-0010966
Feb. 14, 2022   (KR) ........................ 10-2022-0019156
Jan. 19, 2023   (KR) ........................ 10-2023-0008153

(51) Int. Cl.
H01Q 1/12        (2006.01)
H01Q 1/24        (2006.01)
(Continued)

(52) U.S. Cl.
CPC ............. H01Q 1/125 (2013.01); H01Q 1/246 (2013.01); H01Q 3/08 (2013.01); F16C 11/0619 (2013.01);
(Continued)

(58) Field of Classification Search
CPC ......... H01Q 1/125–1264; H01Q 1/246; H01Q 3/02–08
See application file for complete search history.

(56) References Cited

U.S. PATENT DOCUMENTS 10,103,421 B1 *  10/2018  Alexander ............... H01Q 3/06
2003/0124883 A1 *  7/2003  Hsu ........................... H01Q 3/08
                                                                            439/76.1
(Continued)

FOREIGN PATENT DOCUMENTS

JP        2004-363718 A      12/2004
JP        2012-003148 A      1/2012
(Continued)

OTHER PUBLICATIONS

Office Action mailed on May 20, 2025 from Japanese Patent Office for Japanese Application No. 2024-543136.
(Continued)

*Primary Examiner* — Ab Salam Alkassim, Jr.

(57) ABSTRACT

The present invention relates to a small cell base station antenna apparatus, and more particularly, comprises: a radio unit (RU); one or more antenna modules installed on the radio unit so as to be capable of tilting and steering operations; and a multi-function link for mediating the installation of the one or more respective antenna modules on the radio unit, wherein the multi-function link includes male connectors that electrically connect female connectors included in the antenna modules and the radio unit, thus providing the
(Continued)

benefits of improving the workability of indoor installation and facilitating the construction of a small cell base station.

22 Claims, 32 Drawing Sheets

(51) Int. Cl.

| | |
|---|---|
| *H01Q 3/08* | (2006.01) |
| *F16C 11/06* | (2006.01) |
| *H01Q 21/06* | (2006.01) |
| *H01R 13/622* | (2006.01) |

(52) U.S. Cl.

CPC ......... *H01Q 1/1228* (2013.01); *H01Q 1/1264* (2013.01); *H01Q 21/065* (2013.01); *H01R 13/622* (2013.01)

(56) References Cited

U.S. PATENT DOCUMENTS

| | | | | |
|---|---|---|---|---|
| 2008/0238786 A1* | 10/2008 | Bakst | ...................... | H01Q 3/08 |
| | | | | 343/702 |
| 2008/0316133 A1* | 12/2008 | Guixa Arderiu | ....... | H01Q 1/246 |
| | | | | 343/766 |
| 2010/0231450 A1* | 9/2010 | Le Sage | ................. | H01Q 1/125 |
| | | | | 342/359 |
| 2013/0169495 A1* | 7/2013 | Tsai | .......................... | H01Q 3/02 |
| | | | | 343/757 |
| 2014/0227985 A1* | 8/2014 | Sanford | ................... | H01Q 3/08 |
| | | | | 455/90.3 |
| 2014/0321902 A1* | 10/2014 | Taptic | ................. | H01Q 1/1214 |
| | | | | 403/90 |
| 2015/0144758 A1* | 5/2015 | Kolokotronis | ....... | H01Q 1/1228 |
| | | | | 248/282.1 |
| 2017/0033446 A1* | 2/2017 | Zhao | ..................... | H01Q 1/125 |
| 2018/0233800 A1* | 8/2018 | Taptic | ................... | H01Q 1/125 |
| 2020/0259248 A1* | 8/2020 | Lv | .......................... | H01Q 21/28 |
| 2021/0408662 A1* | 12/2021 | Yoo | ...................... | H01Q 1/1264 |
| 2022/0328949 A1* | 10/2022 | Han | ..................... | H01Q 1/1242 |

| | | | | |
|---|---|---|---|---|
| 2023/0114480 A1* | 4/2023 | Clifford | ................. | H01Q 1/125 |
| | | | | 343/757 |
| 2024/0047849 A1* | 2/2024 | Kim | ...................... | H01Q 1/1228 |
| 2024/0213663 A1* | 6/2024 | Kim | ...................... | H01Q 1/1228 |
| 2024/0364004 A1* | 10/2024 | Shim | ...................... | H01Q 1/246 |
| 2025/0063383 A1* | 2/2025 | Kim | ........................ | H01Q 1/246 |
| 2025/0132484 A1* | 4/2025 | Kim | ......................... | H01Q 1/24 |

FOREIGN PATENT DOCUMENTS

| | | | | | |
|---|---|---|---|---|---|
| KR | 20020030576 A | * | 4/2002 | ........... | H01Q 1/1264 |
| KR | 10-2002-0080497 A | | 10/2002 | | |
| KR | 10-2010-0025404 A | | 3/2010 | | |
| KR | 20-2010-0002358 U | | 3/2010 | | |
| KR | 20120133520 A | * | 12/2012 | ............ | H04B 7/155 |
| KR | 20150033119 A | * | 4/2015 | ............ | H04W 84/08 |
| KR | 10-2015-0100103 A | | 9/2015 | | |
| KR | 10-2021-0090107 A | | 7/2021 | | |
| KR | 20220015959 A | * | 2/2022 | .............. | F16B 2/065 |
| WO | 2004/109846 A1 | | 12/2004 | | |
| WO | 2010/106439 A2 | | 9/2010 | | |

OTHER PUBLICATIONS

International Search Report mailed on Apr. 28, 2023 for International Application No. PCT/KR2023/001011 and its English translation.

1711026514, pp. 1-241, Nov. 25, 2017 (Korea Advanced Institute of Science and Technology et al. Final Report on Development of small basestation supporting multiple stremns based on LTE-A systems. The Third Yem Final Report of the Broadcasting and Communication Industry Technology Development Program, Ministry of Science, ICT and Future Planning).

Ko, Jin-Hyun et al. 800MHz Band Dual-fed ICS Repeater Antenna with High Isolation, Journal of the Korea Institute of Information and Communication Engineering). vol. 20, No. 5, pp. 867-873, May 31, 2016.

European Search Report dated Feb. 5, 2026 from European Patent Office for Application No. 23747268.3.

* cited by examiner

FIG. 1
(PRIOR ART)

[FIG. 2]
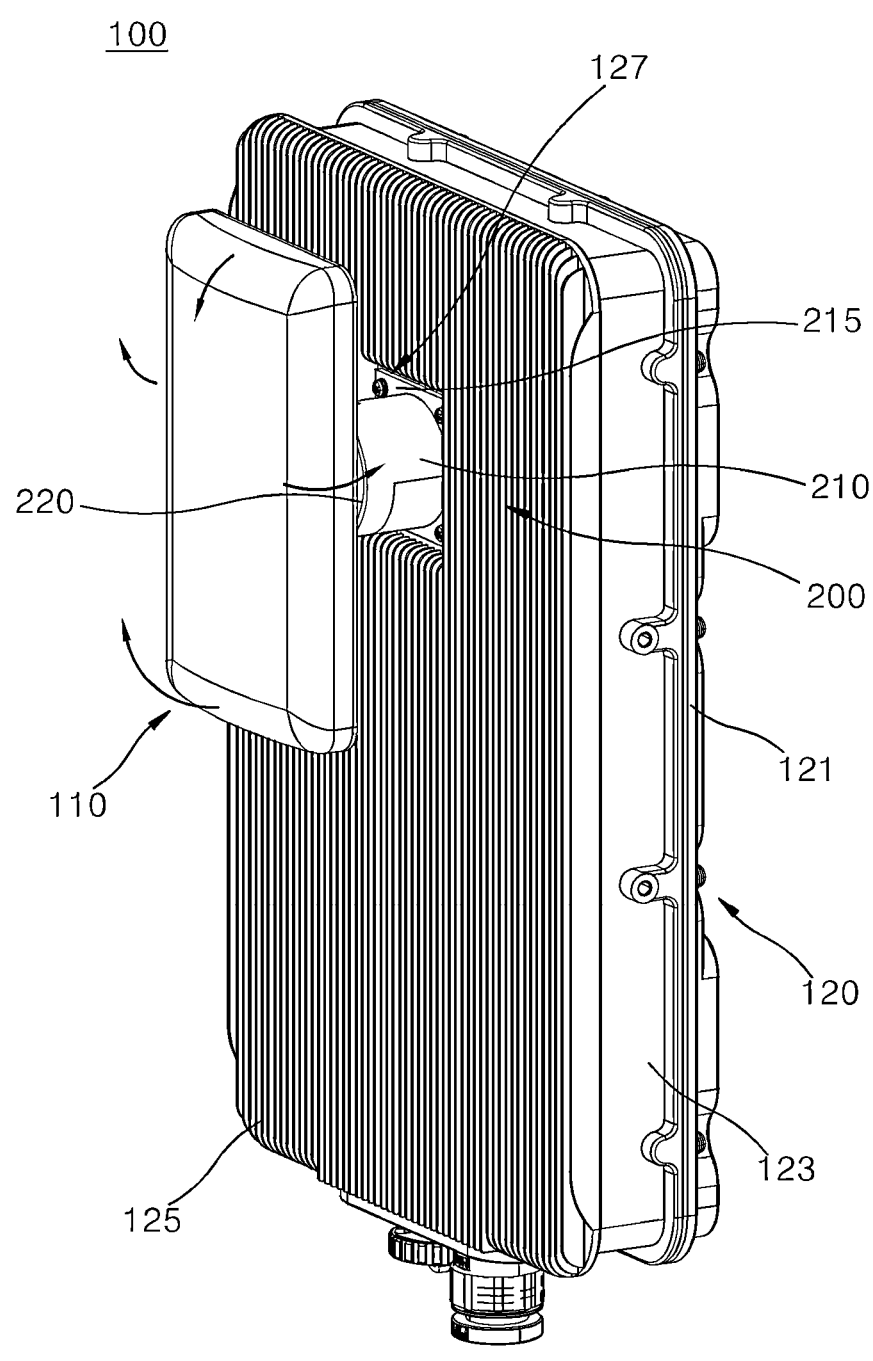

[FIG. 3]
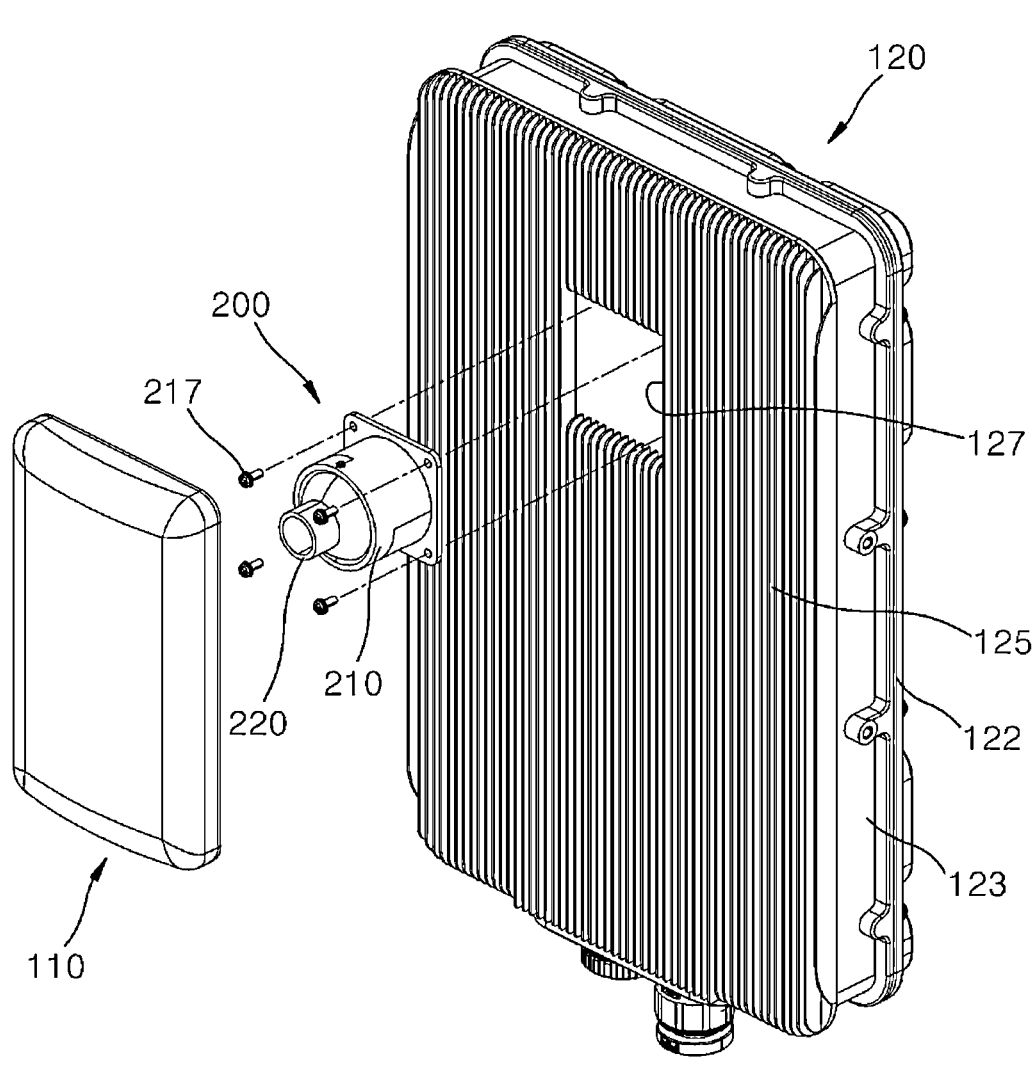

[FIG. 4]
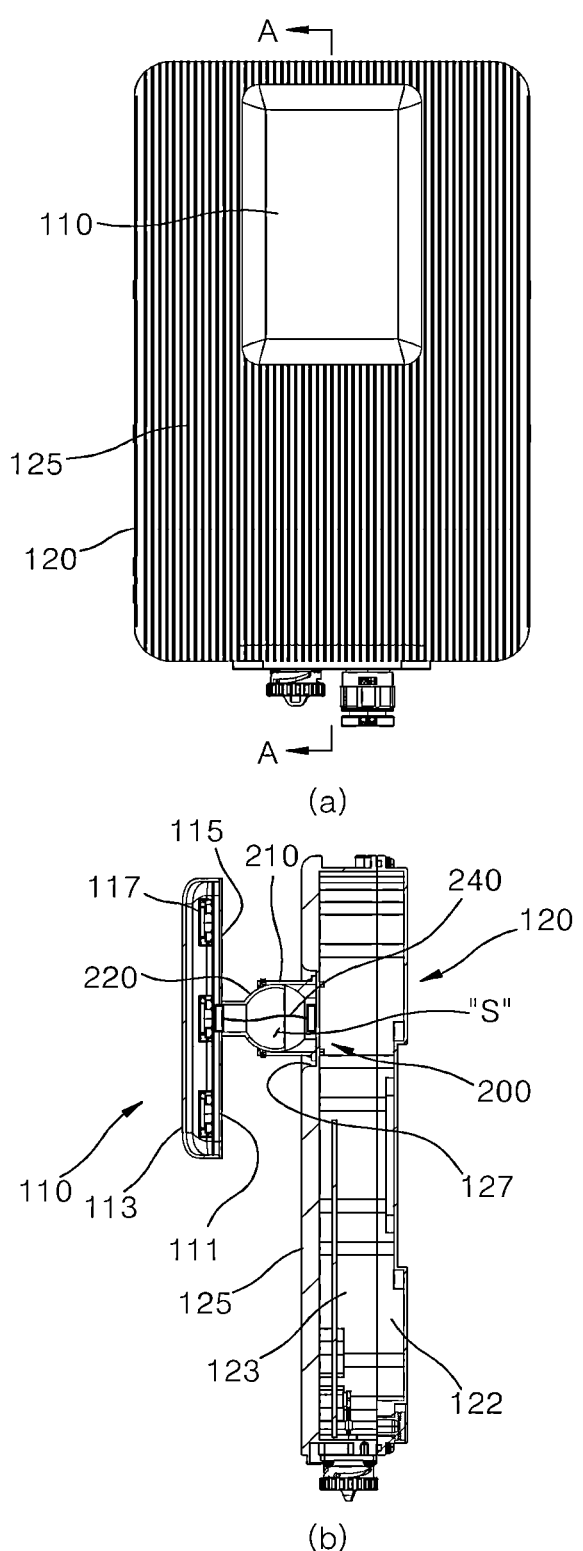
(a)
(b)

[FIG. 5]
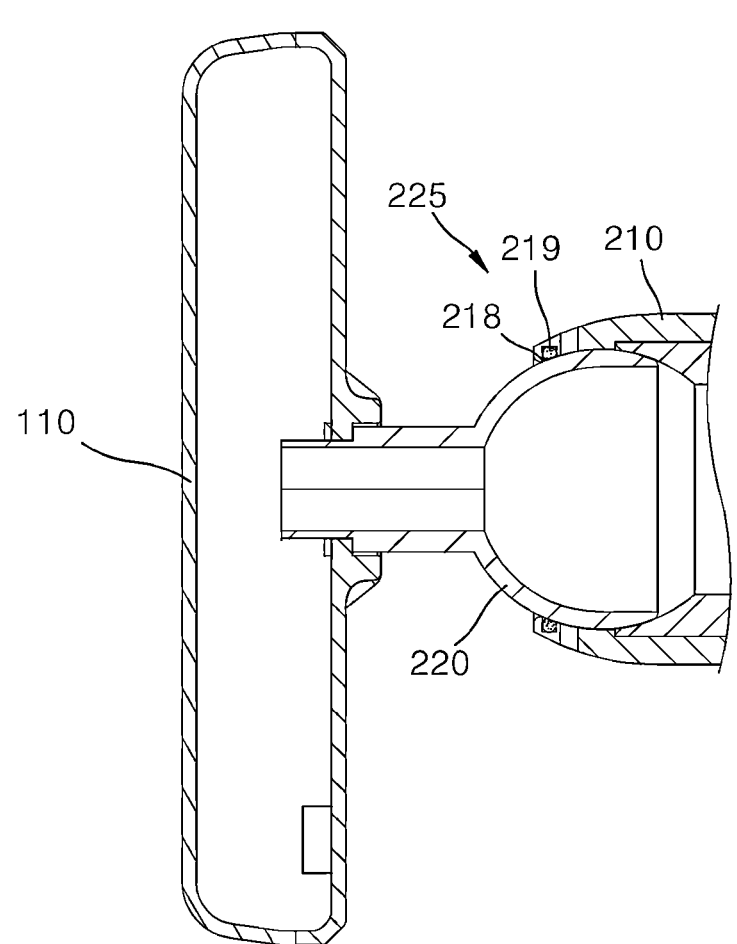

[FIG. 6]
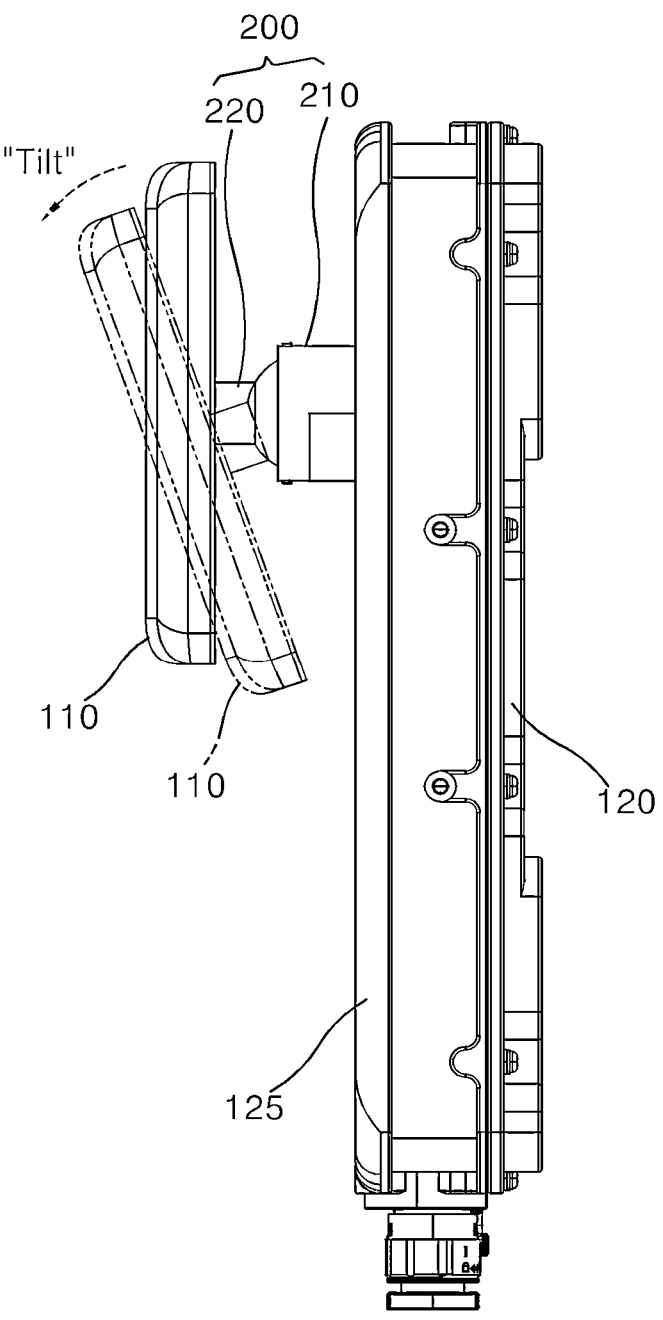

[FIG. 7]
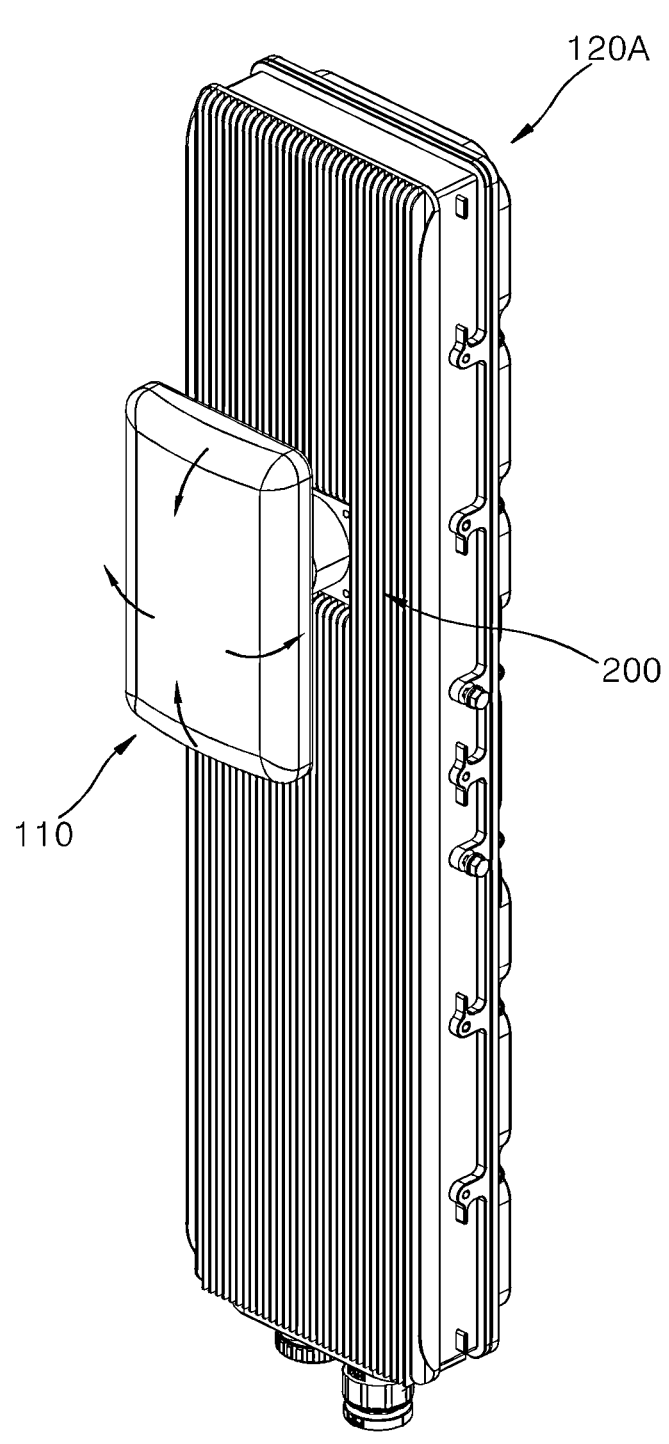

[FIG. 8]
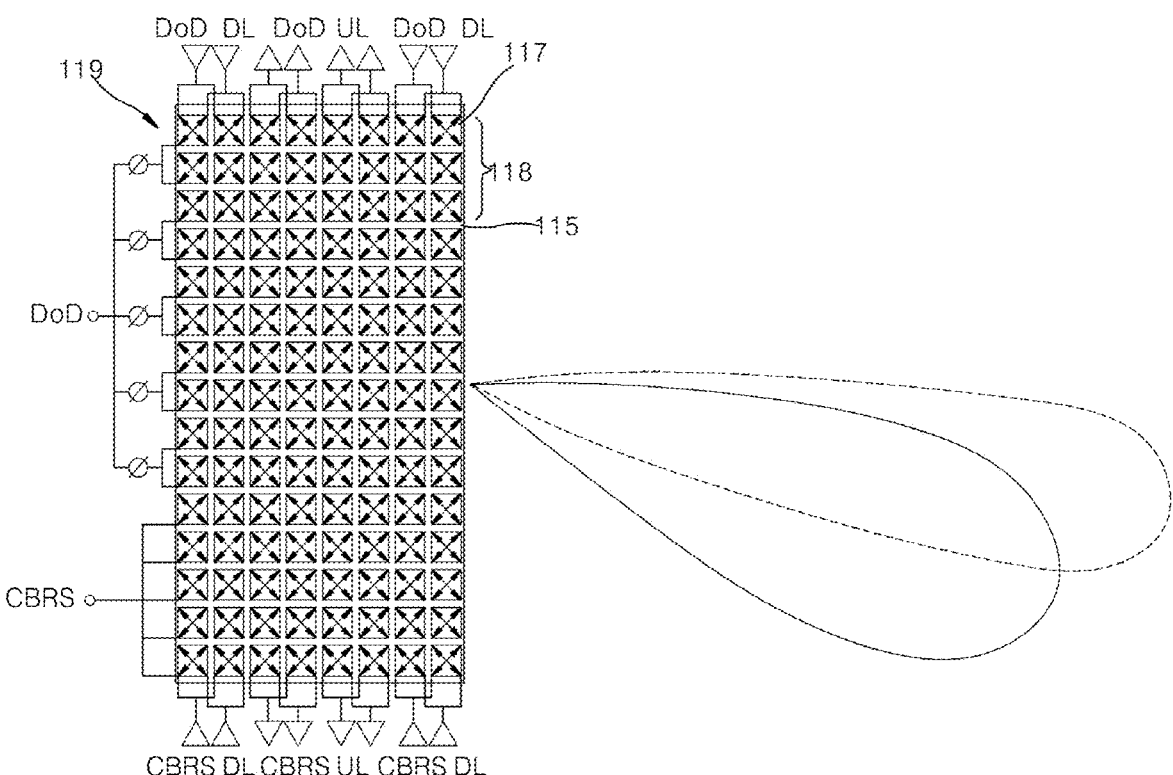

[FIG. 9]
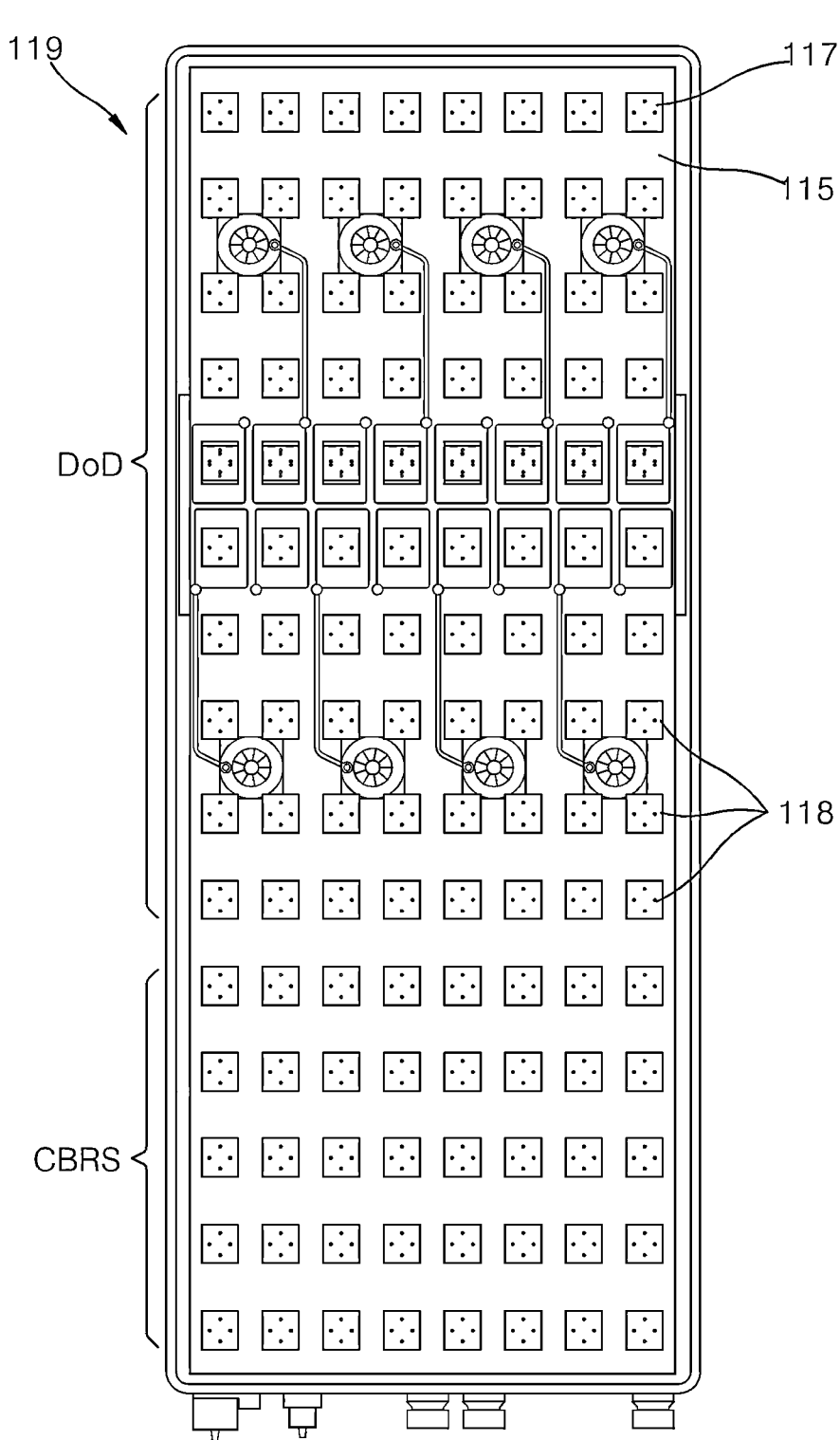

[FIG. 10A]
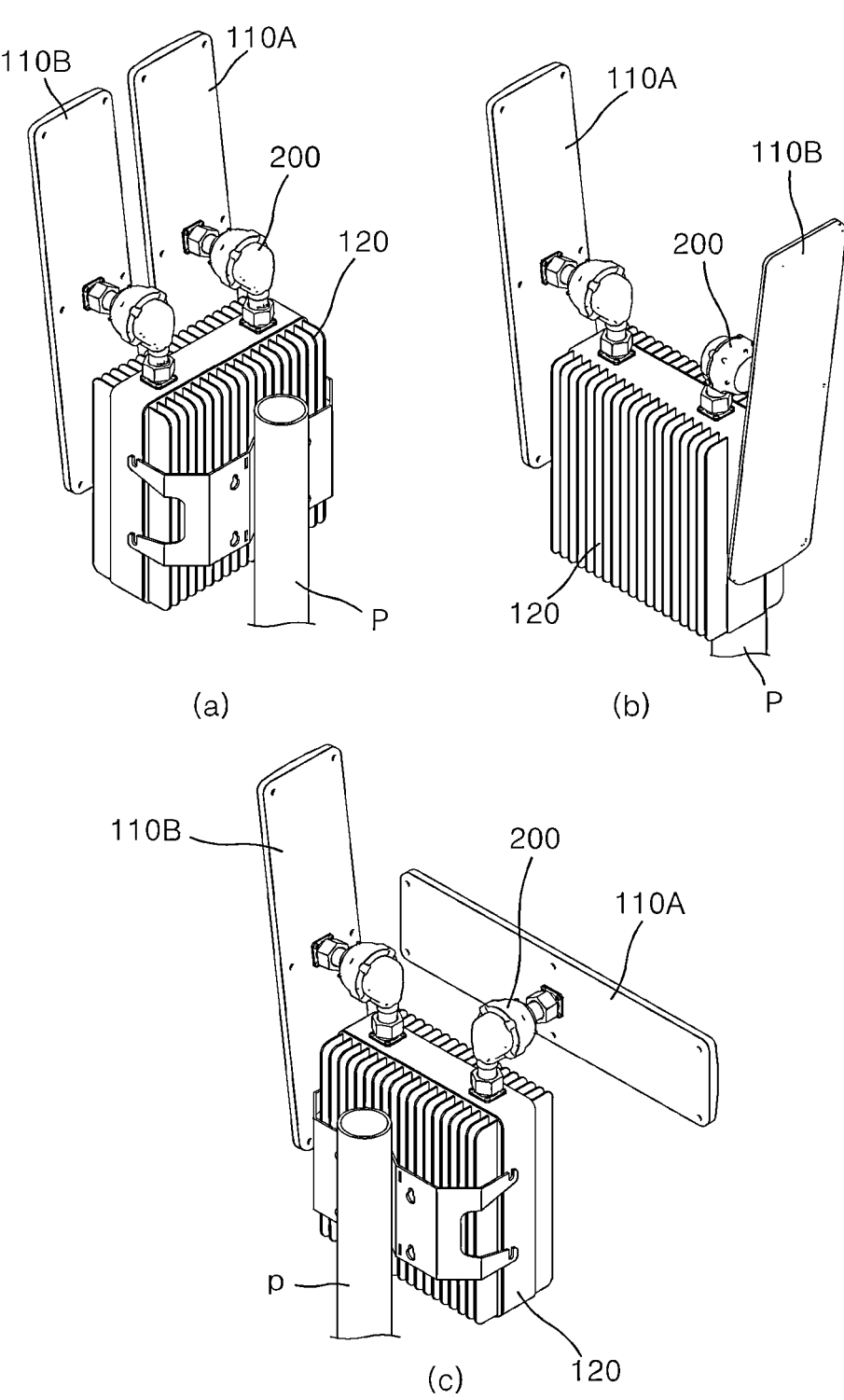
(a)
(b)
(c)

[FIG. 10B]
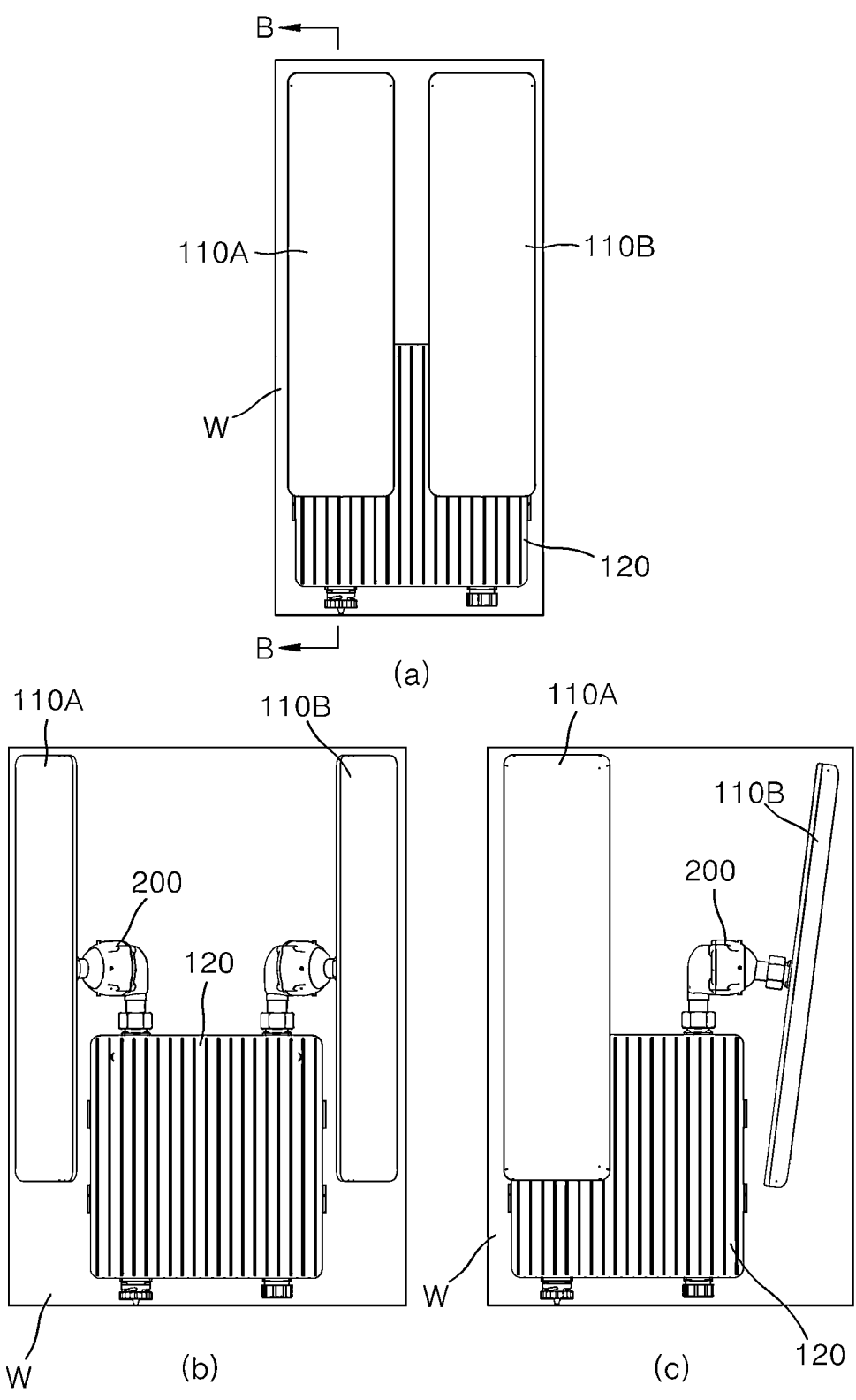

[FIG. 11]
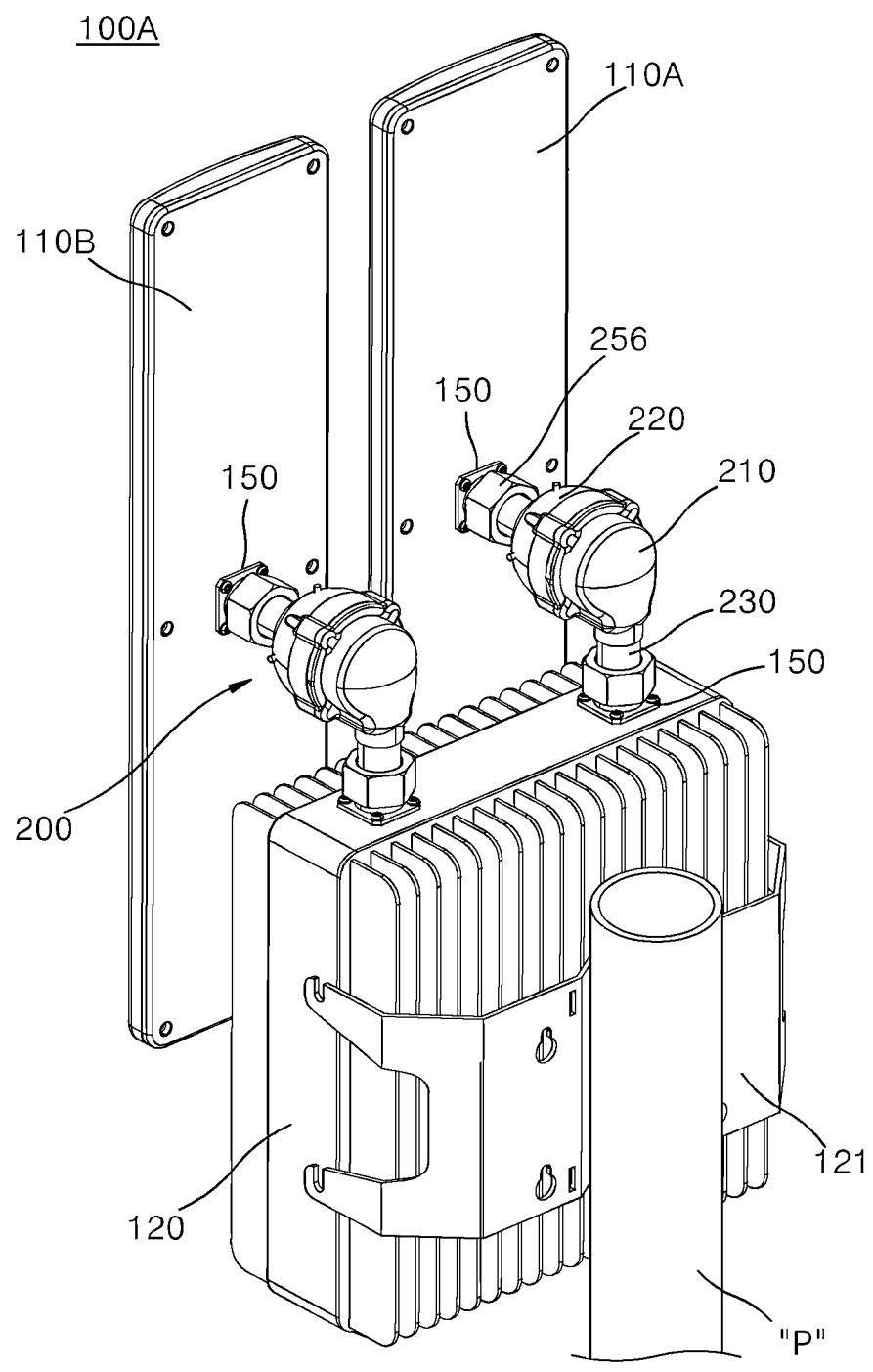

[FIG. 12]
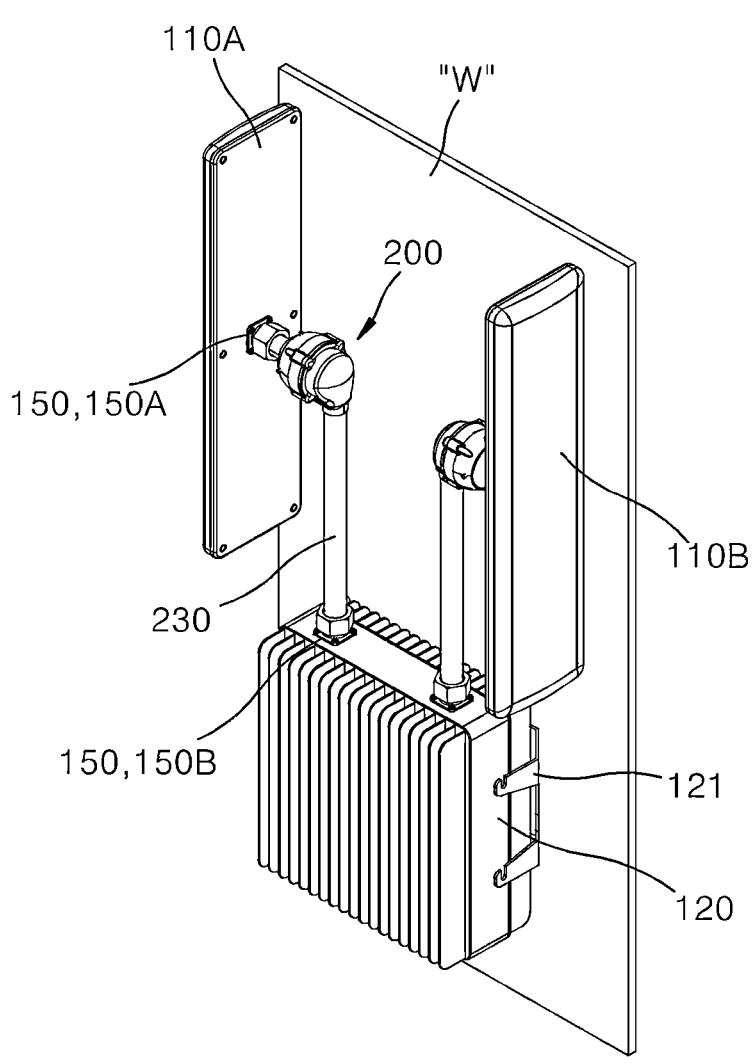

[FIG. 13]
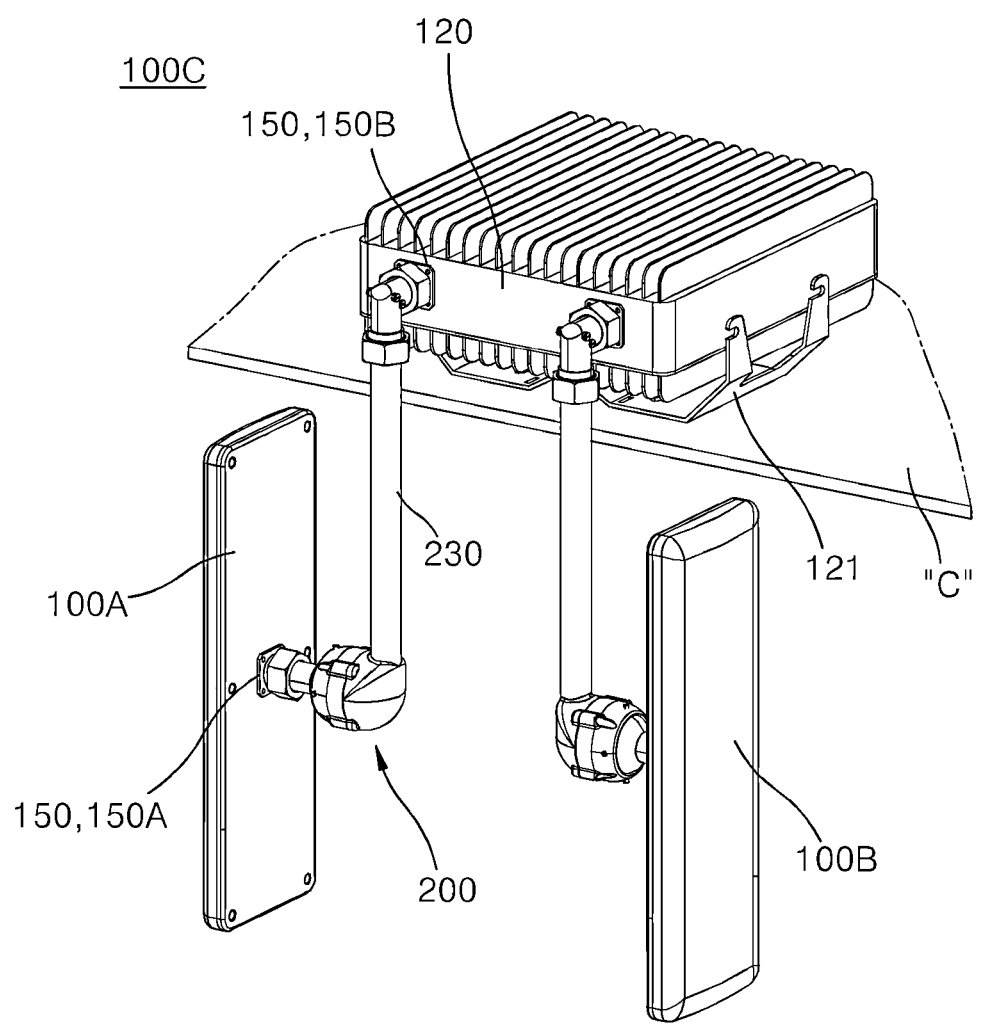

[FIG. 14]
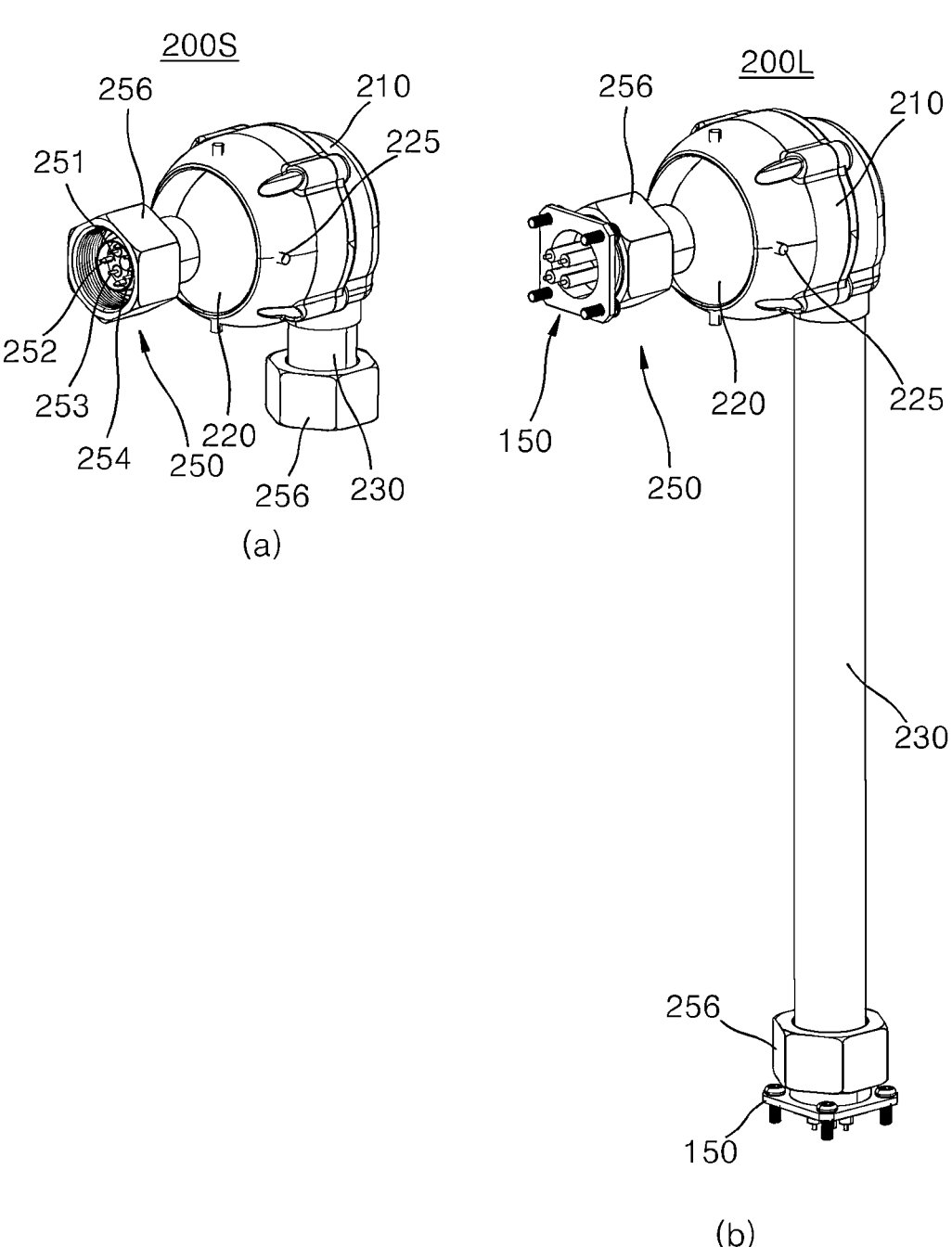
(a)
(b)

[FIG. 15]
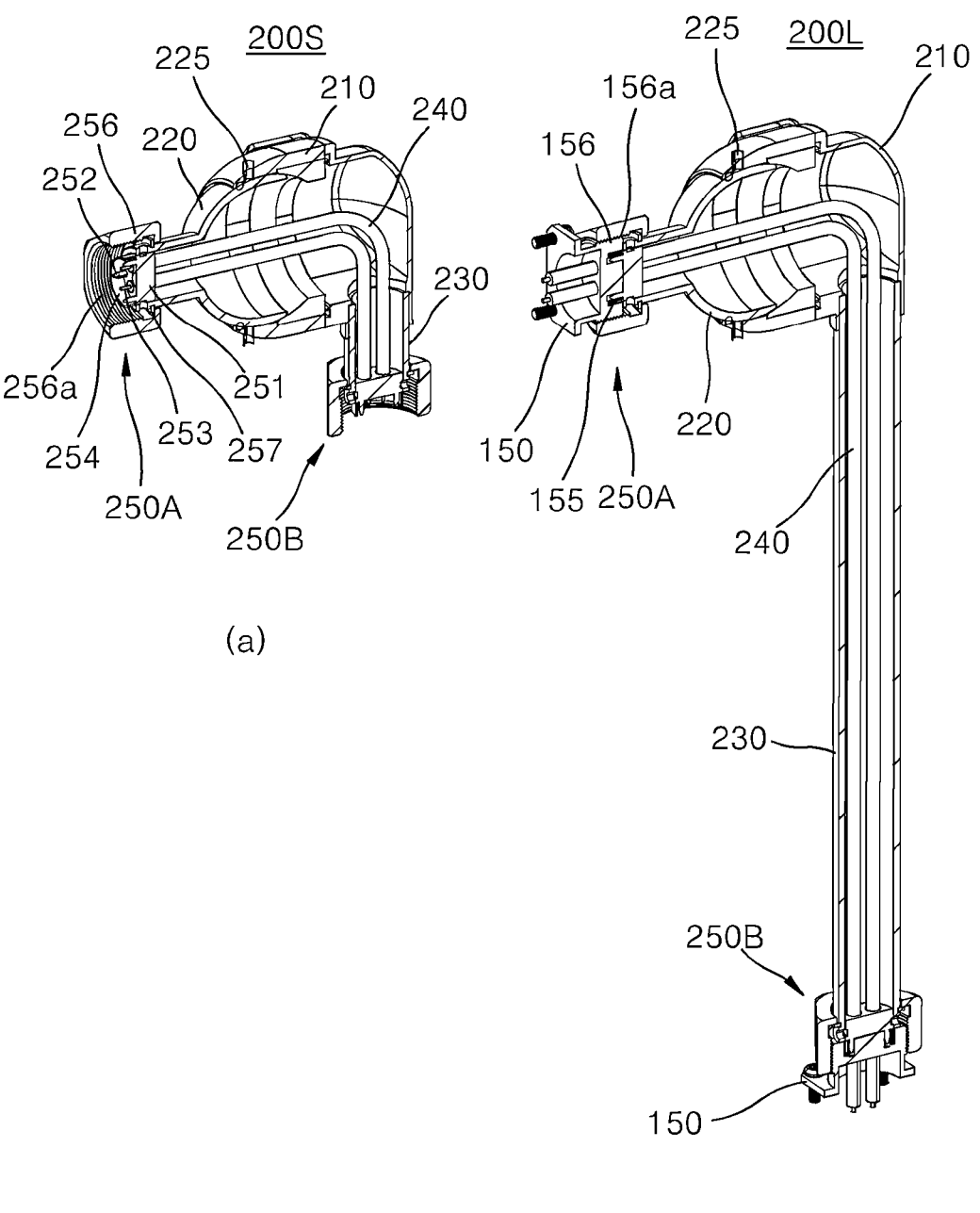
(a)
(b)

[FIG. 16]
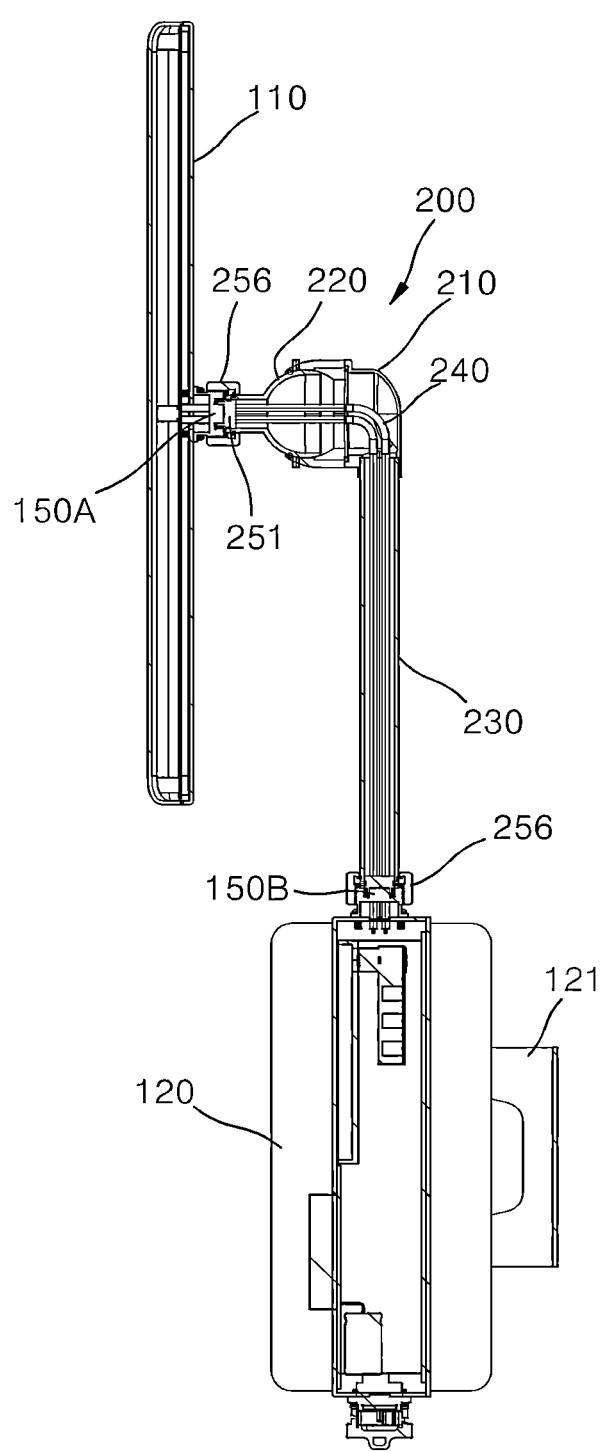

[FIG. 17]
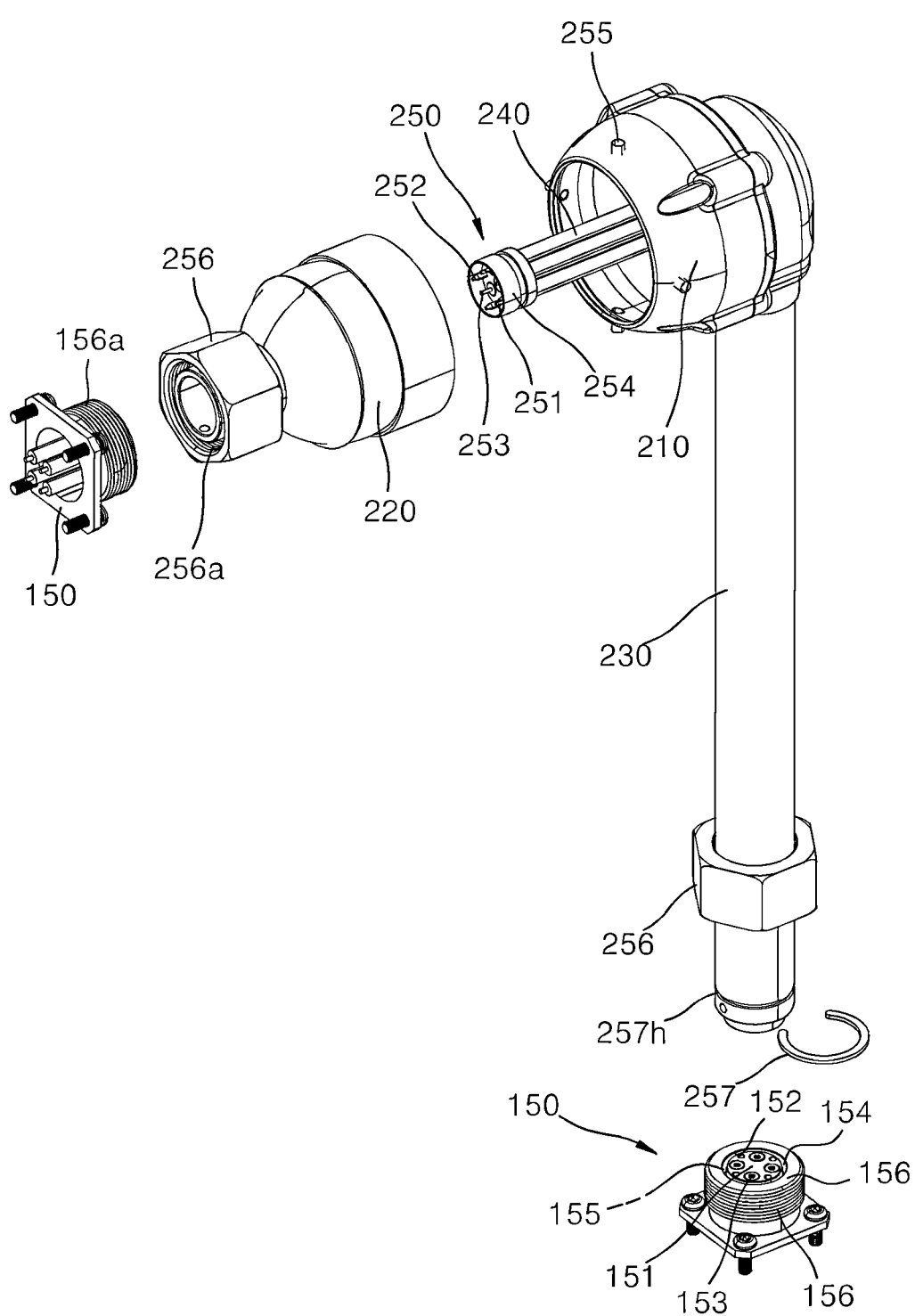

[FIG. 18]
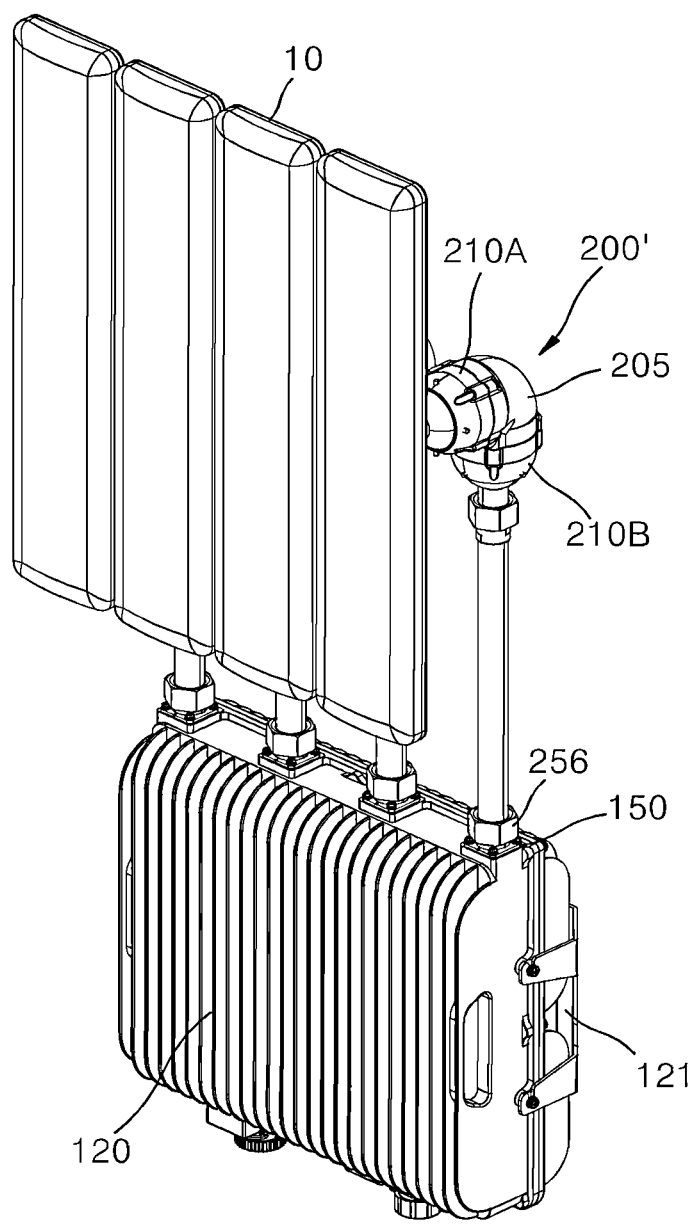

[FIG. 19A]
<u>100</u>
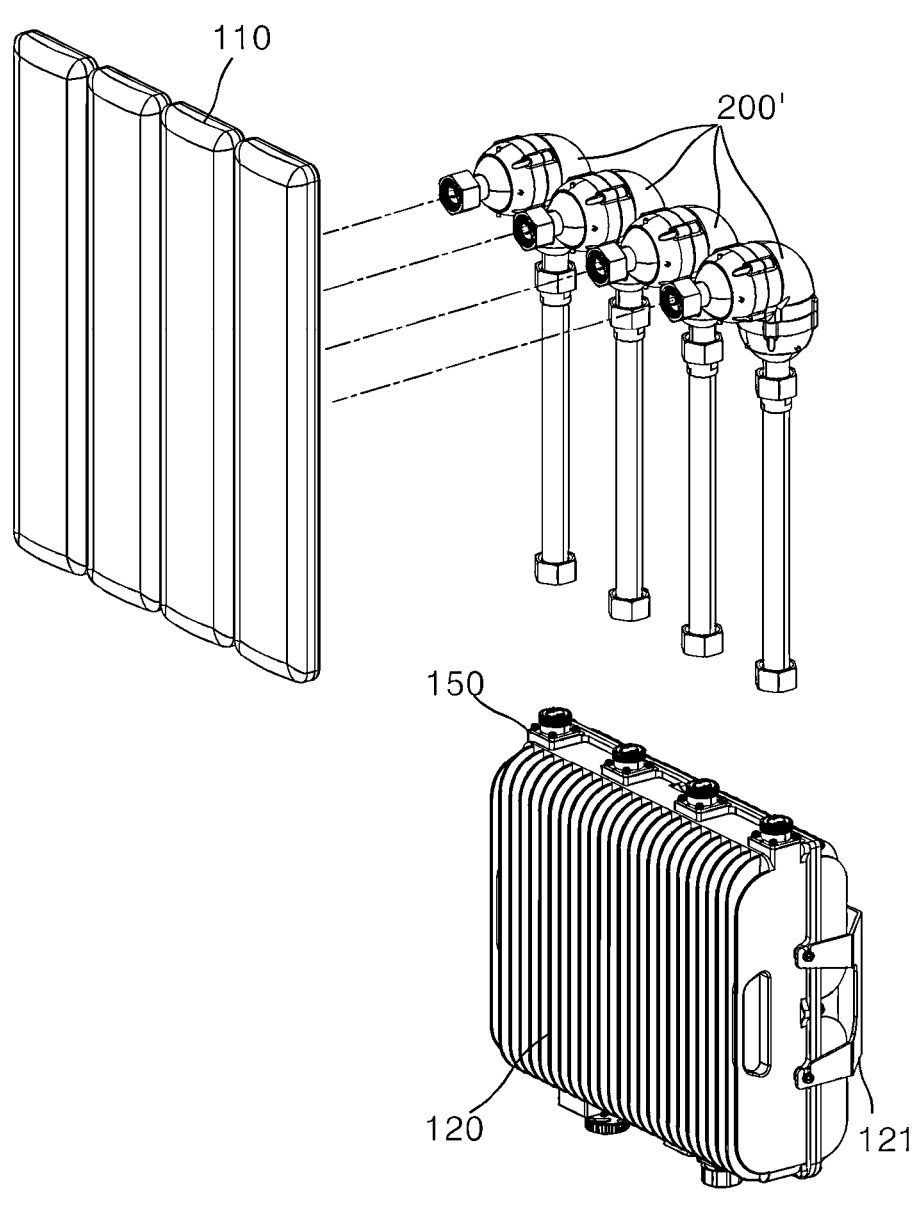

[FIG. 19B]
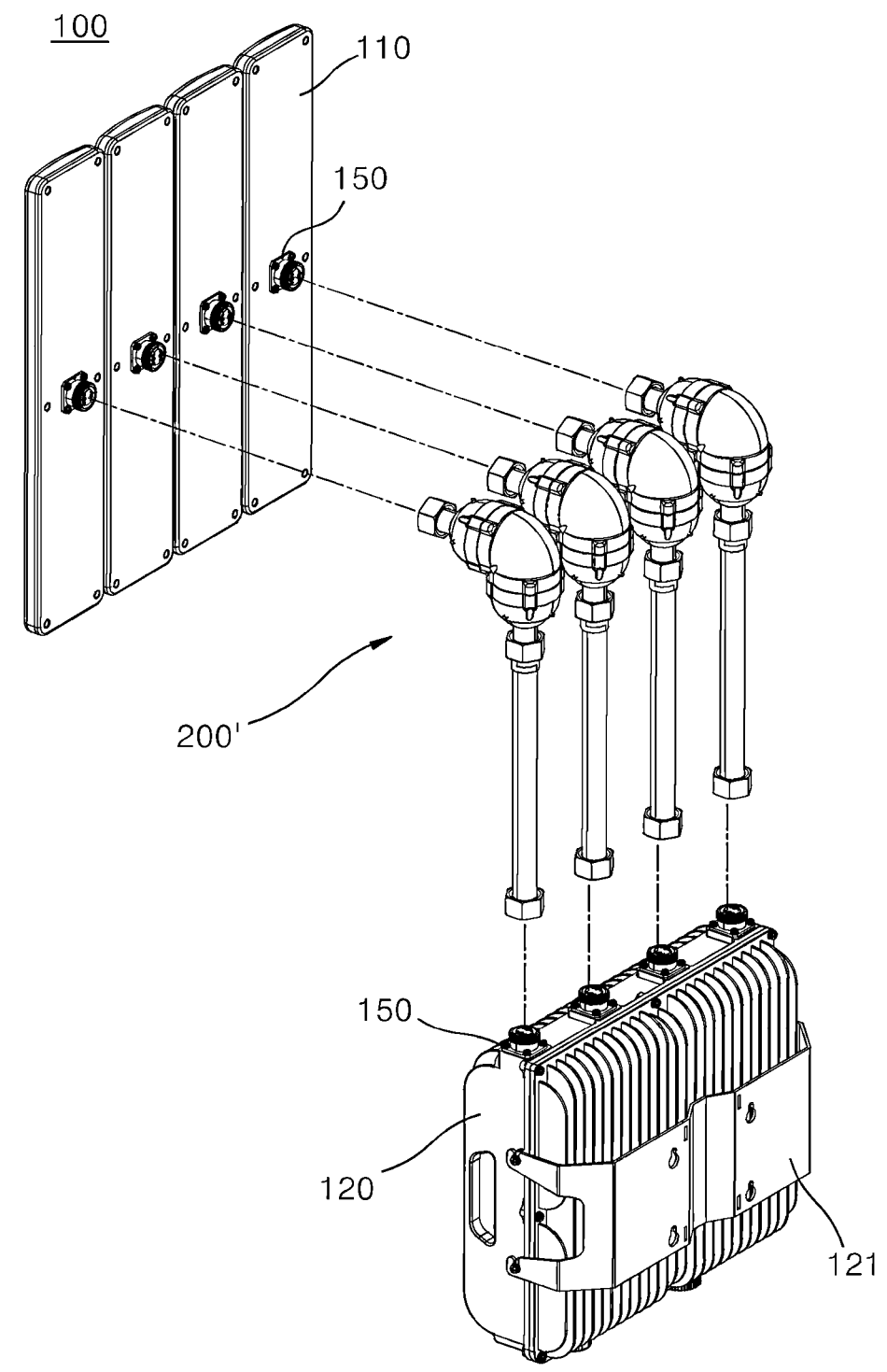

[FIG. 20]
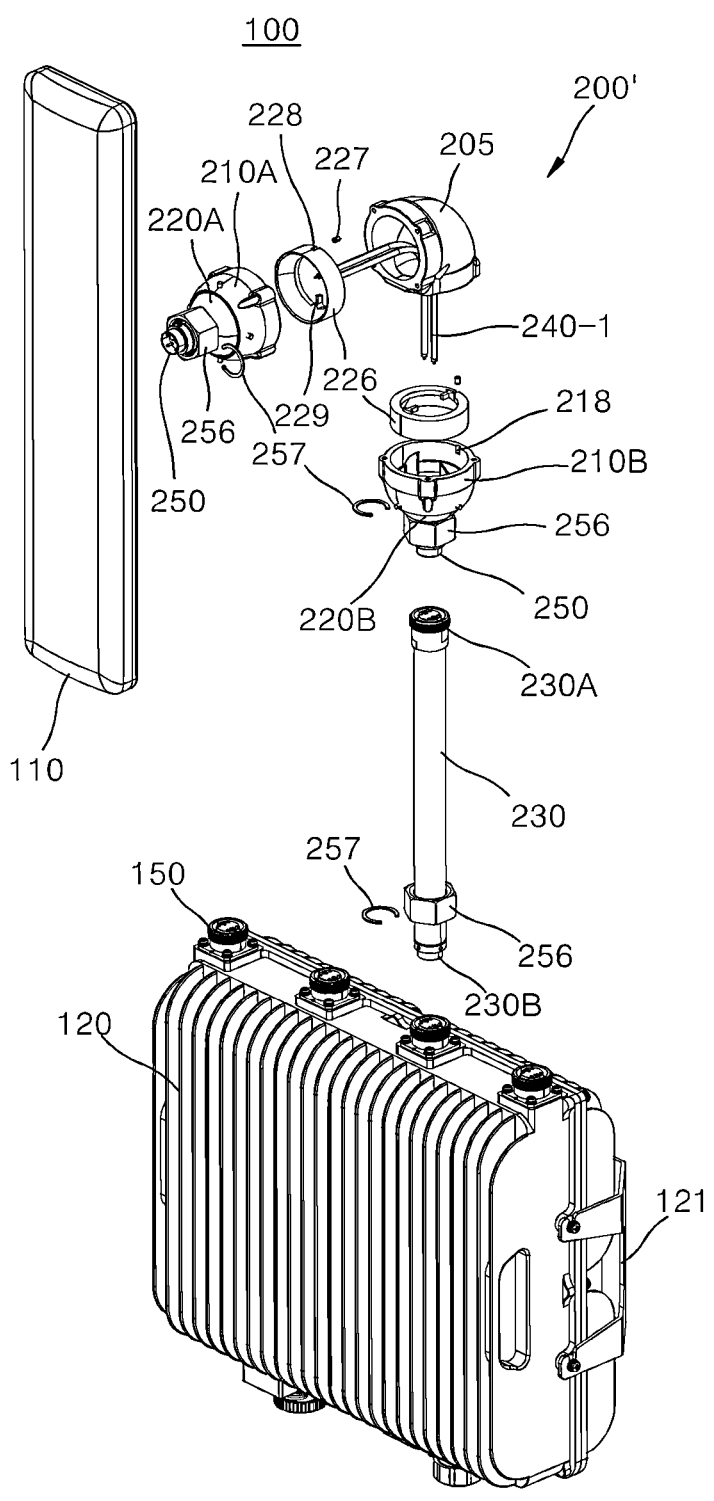

[FIG. 21]
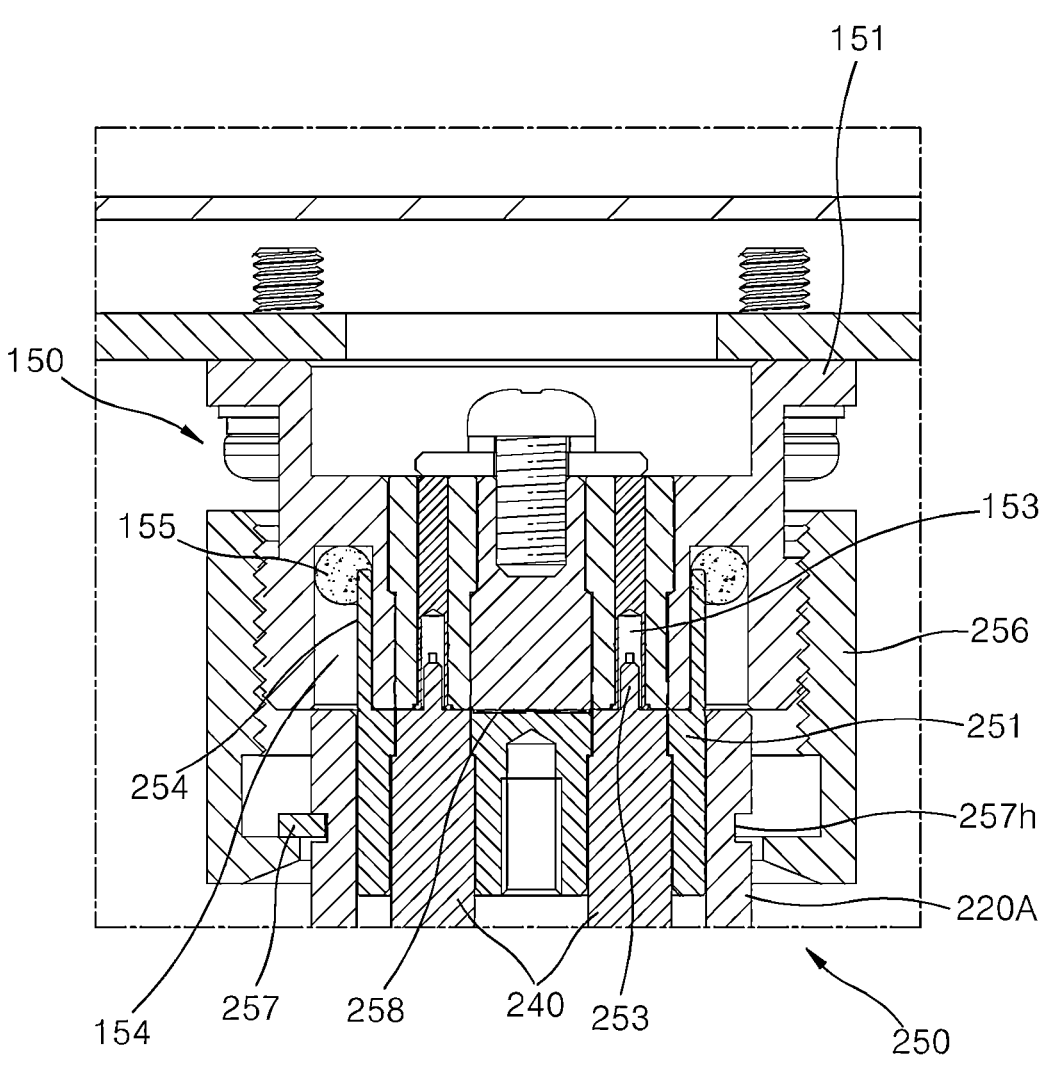

[FIG. 22]
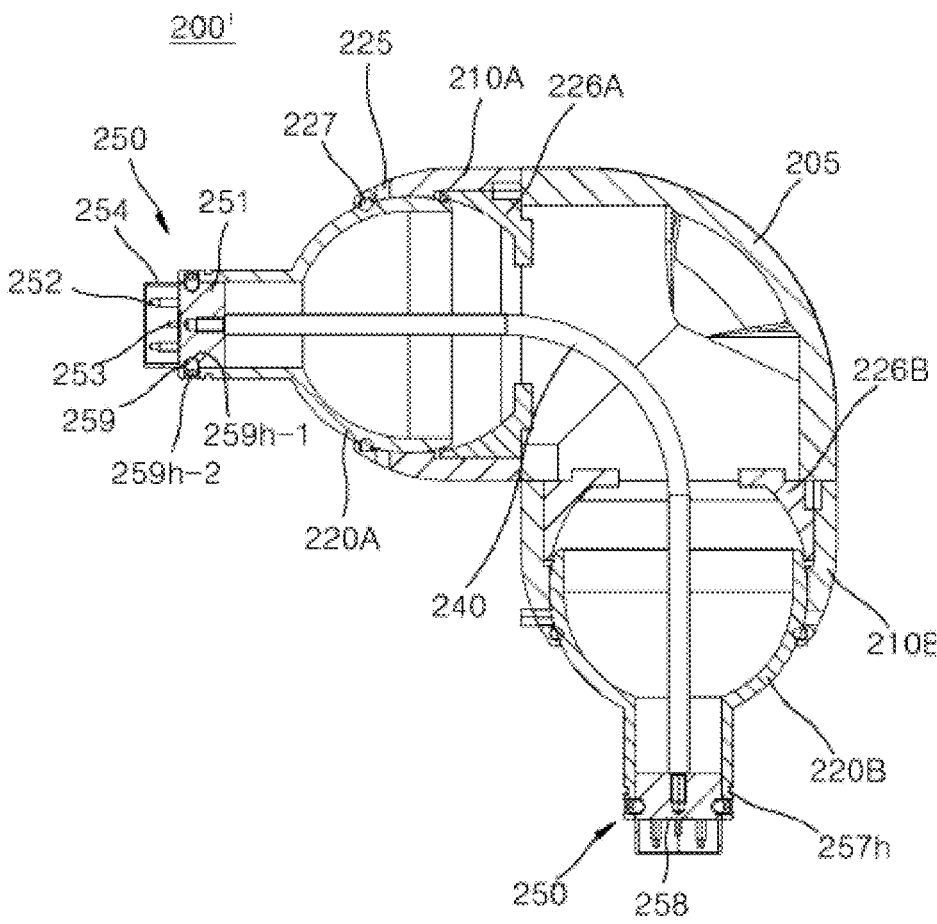

[FIG. 23]
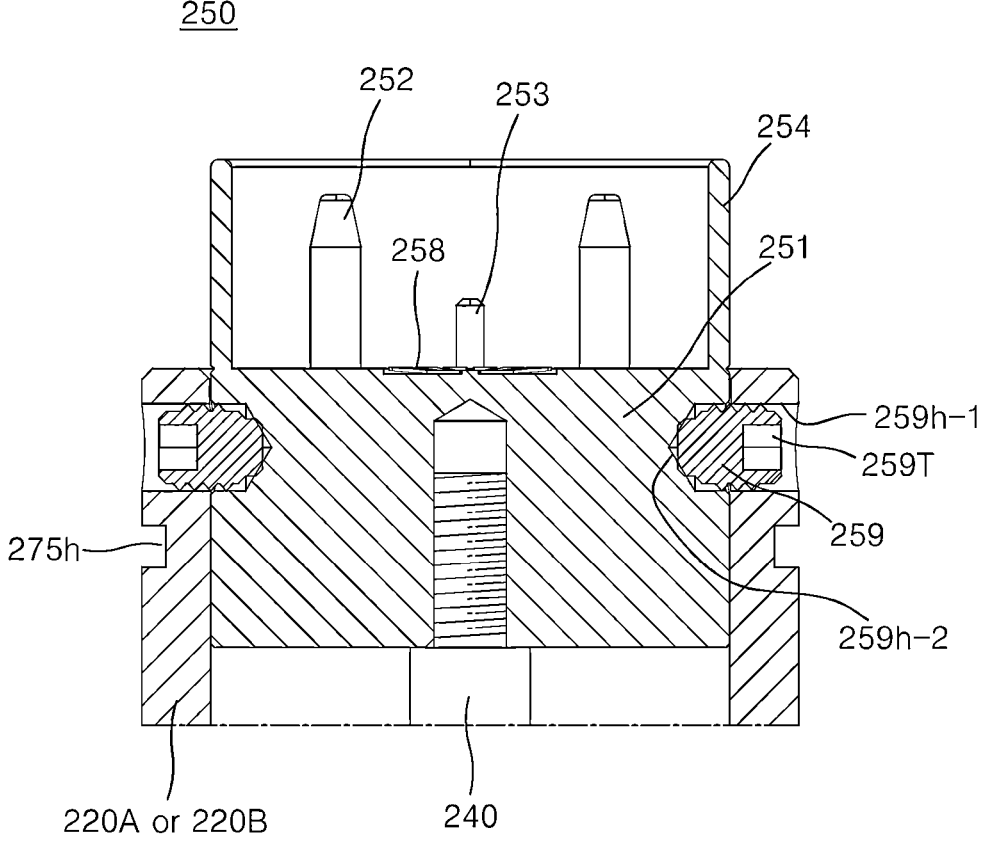

[FIG. 24]
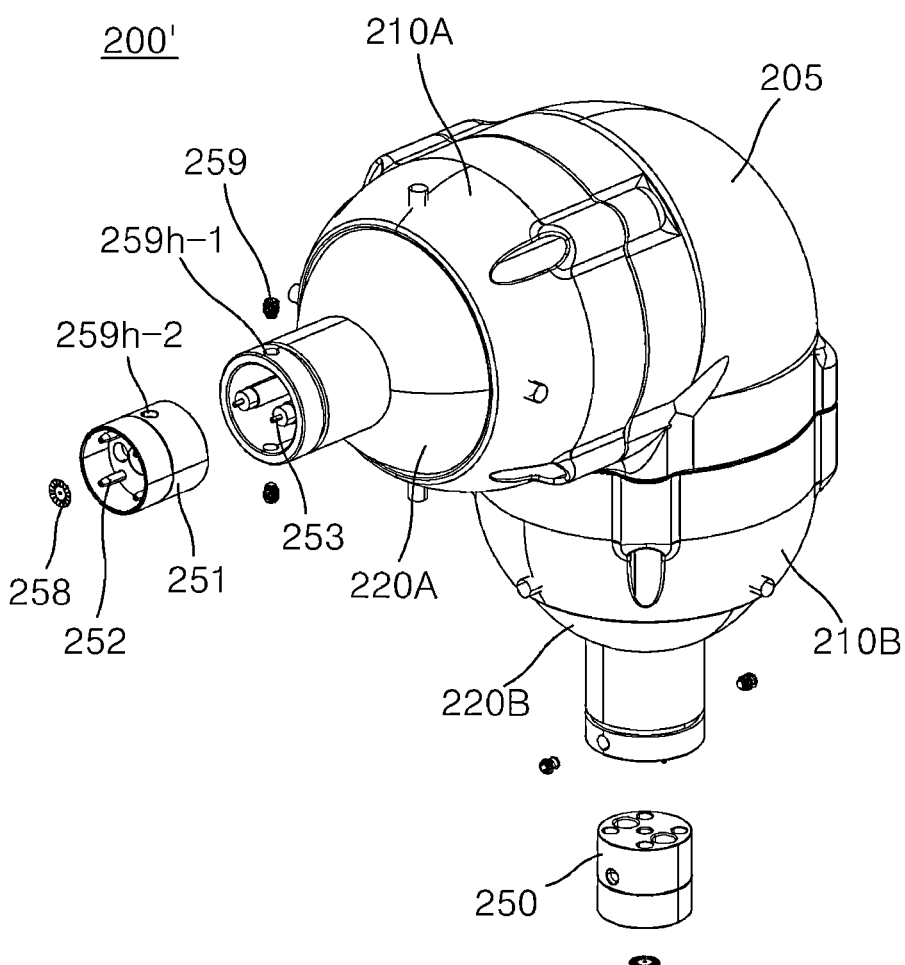

[FIG. 25]
200'
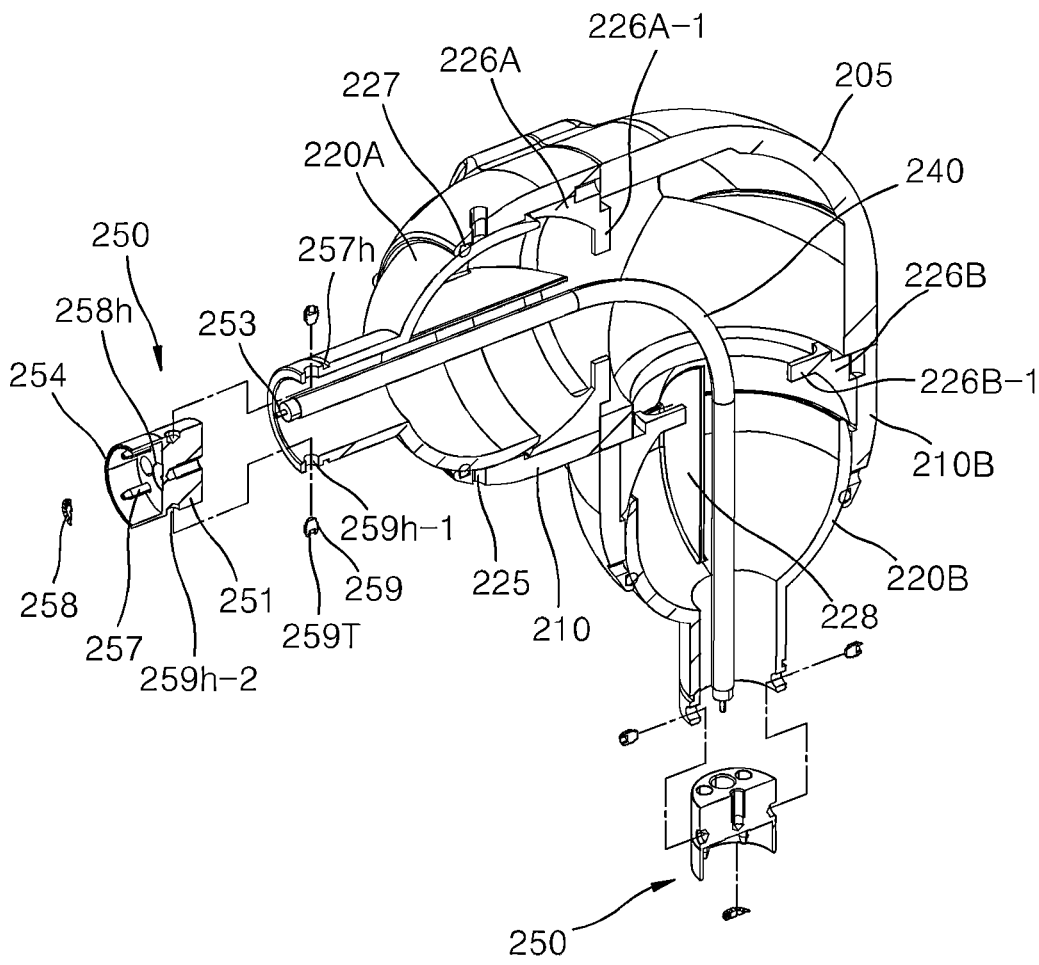

[FIG. 26]
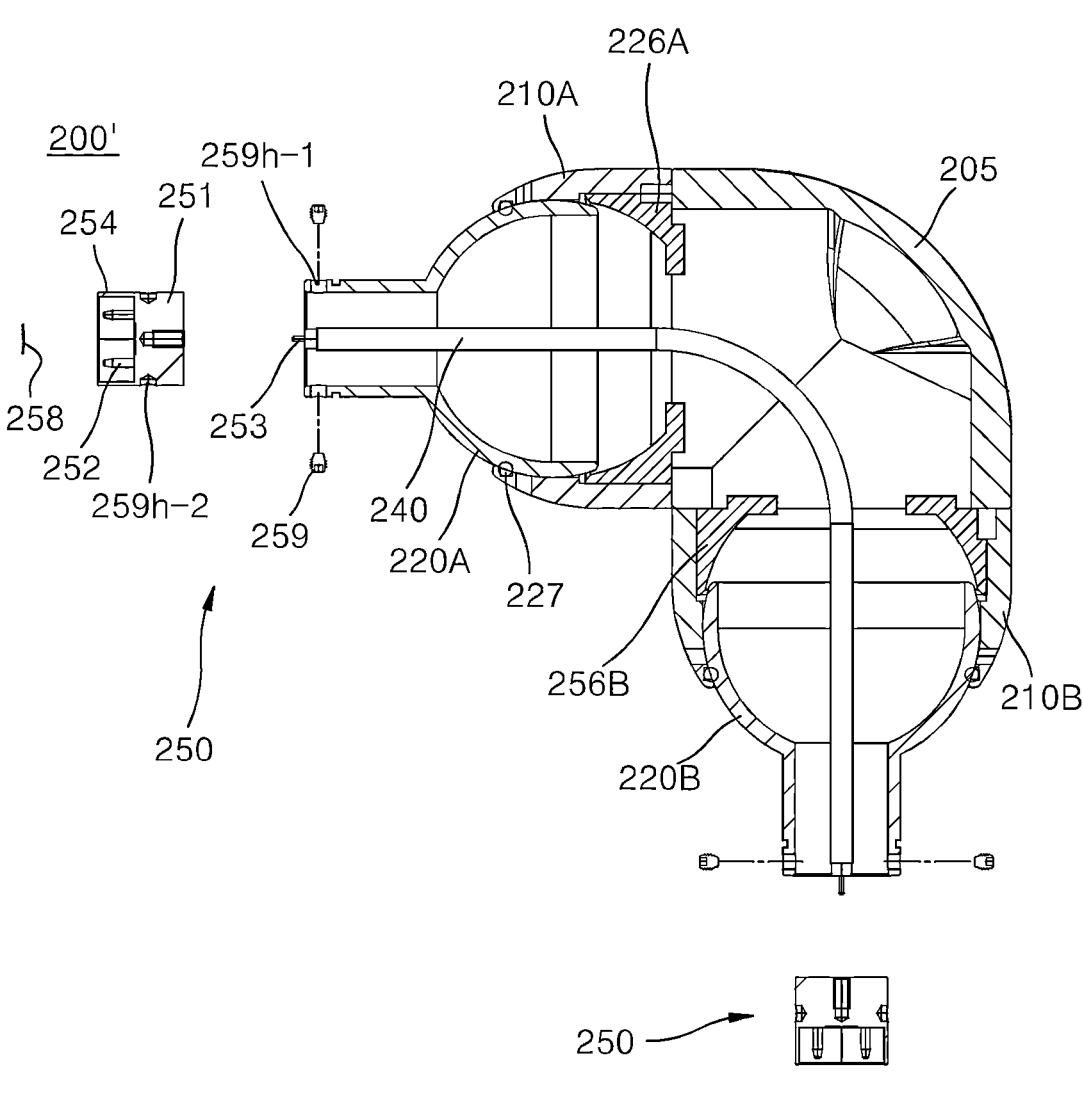

[FIG. 27]
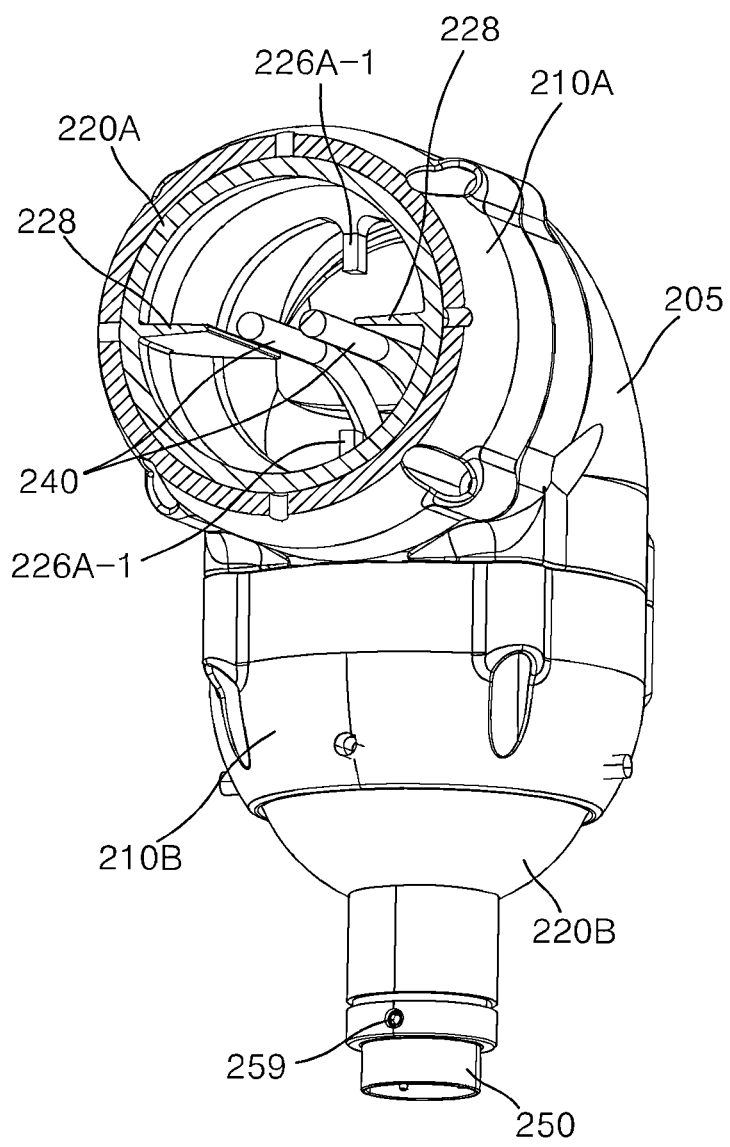

[FIG. 28]
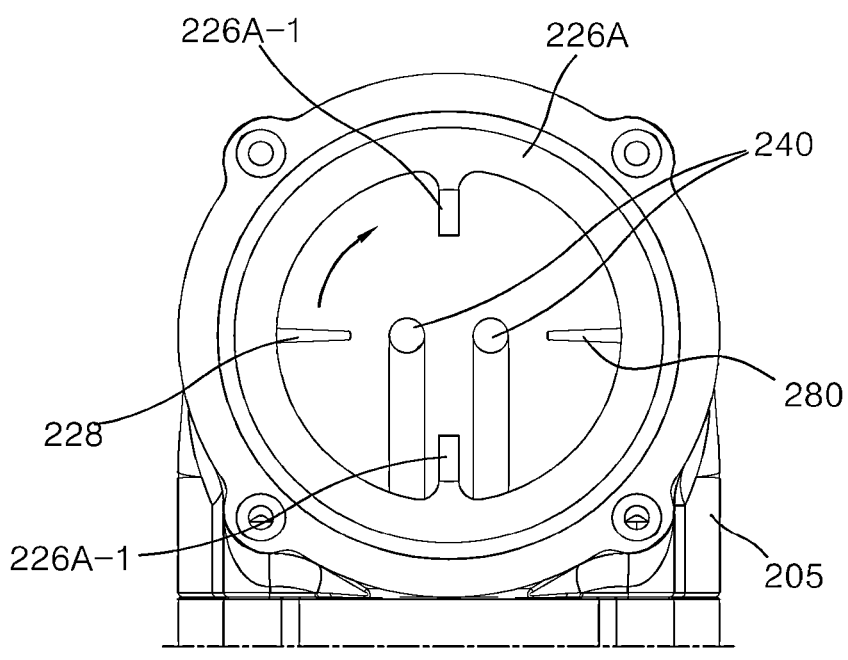
(a)
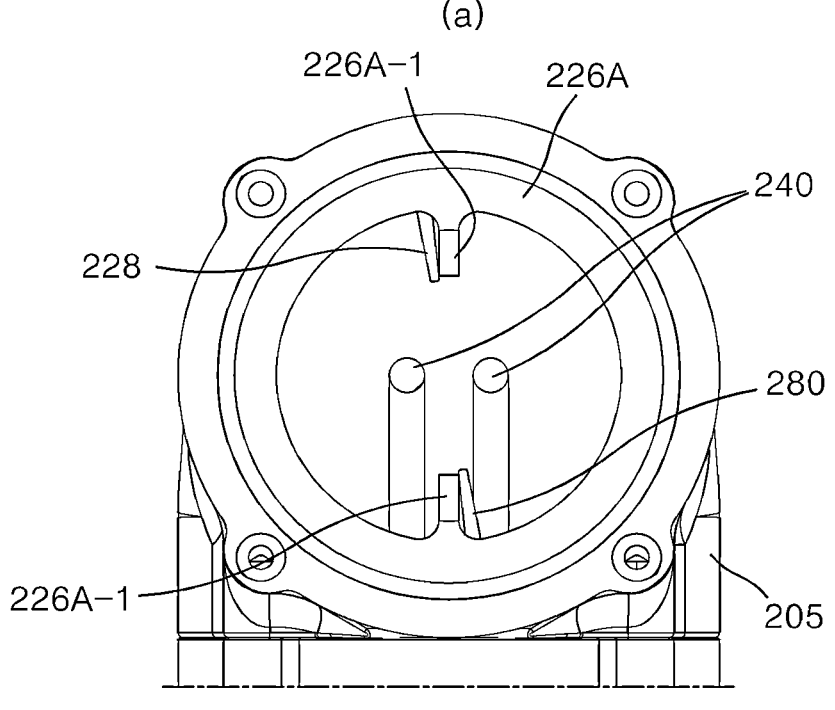
(b)

[FIG. 29]
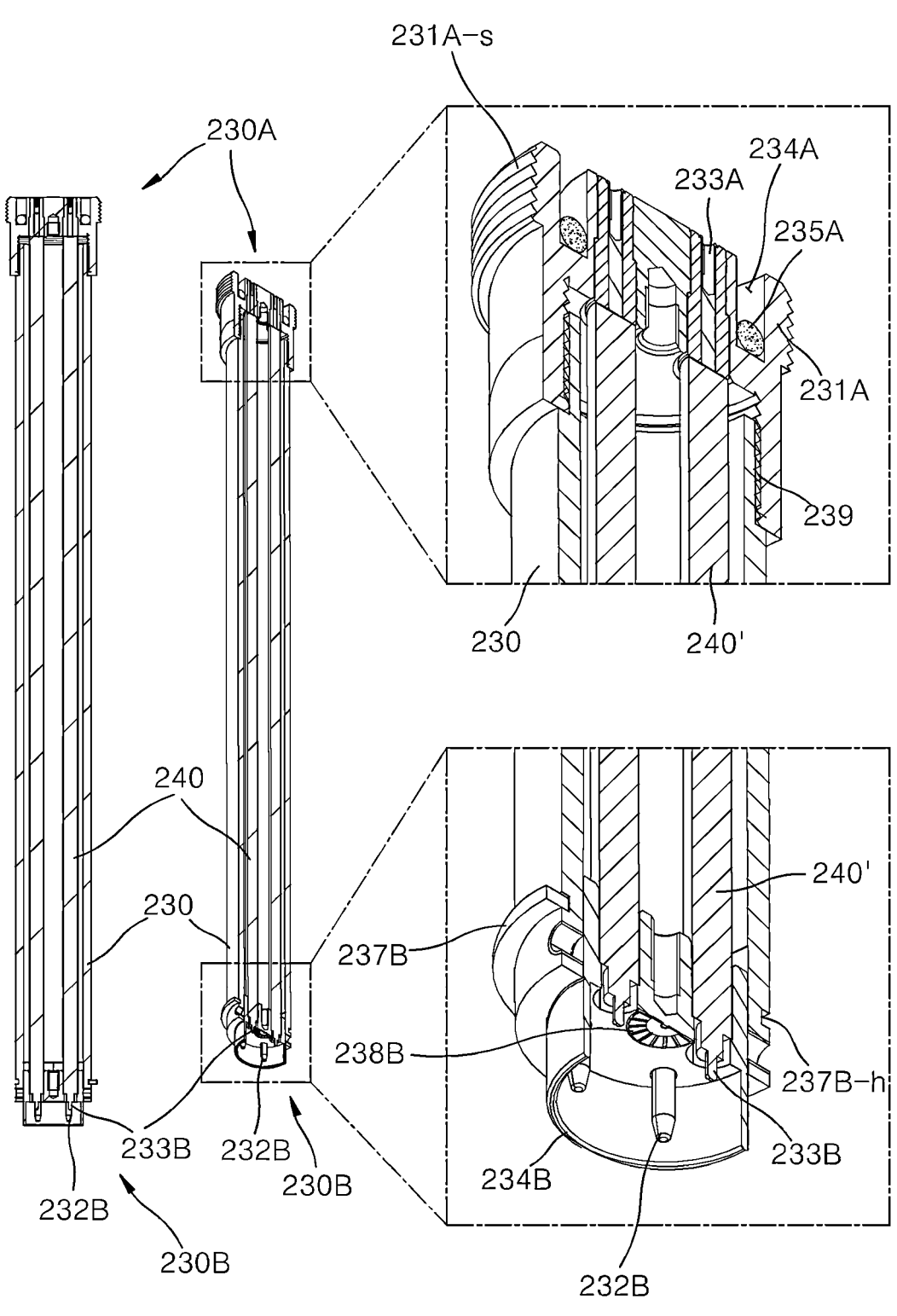

[FIG. 30]
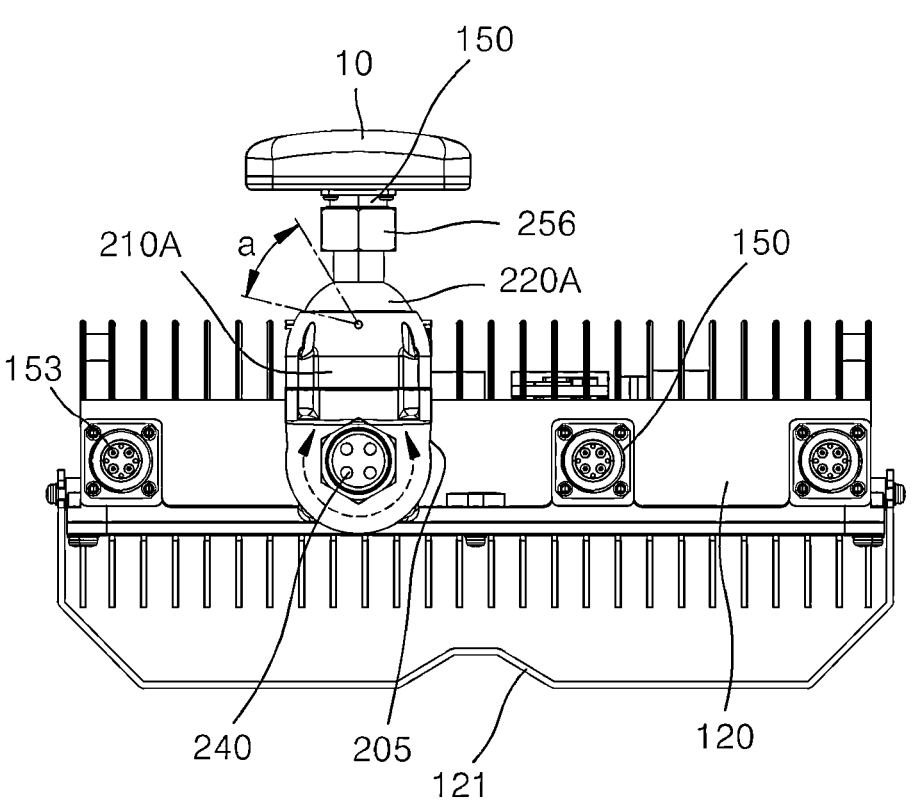

SMALL CELL BASE STATION ANTENNA APPARATUS

CROSS-REFERENCE TO RELATED APPLICATIONS

This application is a continuation application of International Application No. PCT/KR2023/001011, filed Jan. 20, 2023, which claims the benefit of Korean Patent Application Nos. 10-2022-0010966, filed Jan. 25, 2022; 10-2022-0019156, filed Feb. 14, 2022; and 10-2023-0008153, filed Jan. 19, 2023, in the Korean Intellectual Property Office, the disclosures of which are incorporated herein in their entirety by reference.

TECHNICAL FIELD

The present disclosure relates to a small cell base station antenna apparatus, and more particularly, to a small cell base station antenna apparatus, which prevents an external appearance of cables from being exposed, facilitates the construction of an indoor small cell, and can perform beamforming so that an implementation of a dual band is possible by being provided to cover a different frequency band by partitioning a part of one antenna module or cover different frequency bands of a plurality of antenna modules.

BACKGROUND ART

In order to satisfy wireless data traffic demands that tend to increase after 4G communication system commercialization, efforts to develop an enhanced 5G communication system or a pre-5G communication system are being made. For this reason, the 5G communication system or the pre-5G communication system is called a beyond 4G network communication system or a post LTE system. In order to achieve a high data transfer rate, an implementation of the 5G communication system in a mmWave band (e.g., a 60 Giga (60 GHZ) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming, and large scale antenna technologies have been discussed in the 5G communication system.

In particular, in a future 5G cellular network that requires a capacity much higher than a current capacity, various technologies for increasing frequency efficiency may be applied. In a small cell network (SCN) technology, that is, one of several technology candidates, the usefulness of a channel can be increased by reducing the size of a cell, and frequency efficiency and the capacity can be increased by increasing the density of cells.

Unlike the existing macro cell having wide coverage along with high transmission power, a small cell is a small cell base station having narrow coverage with low transmission power. The category of the small cell commonly refers to small output base station equipment, a pico cell, a femto cell, Wi-Fi, etc., which have 10 W grade or less. The small cell has advantages in that it has a low construction cost compared to the macro cell and can improve space efficiency due to a small size.

If such small cells are overlappingly constructed at places, such as public places, densely populated areas, and large shopping malls or airport buildings, a capacity per unit area may be increased. Accordingly, there is an advantage in that power and an installation cost for one macro cell base station can be reduced. It is expected that a small cell will become a base technology that connects 4G and 5G because a capacity that is 1000 times the capacity of the existing LTE can be achieved through only a small cell base station.

Figure 1:
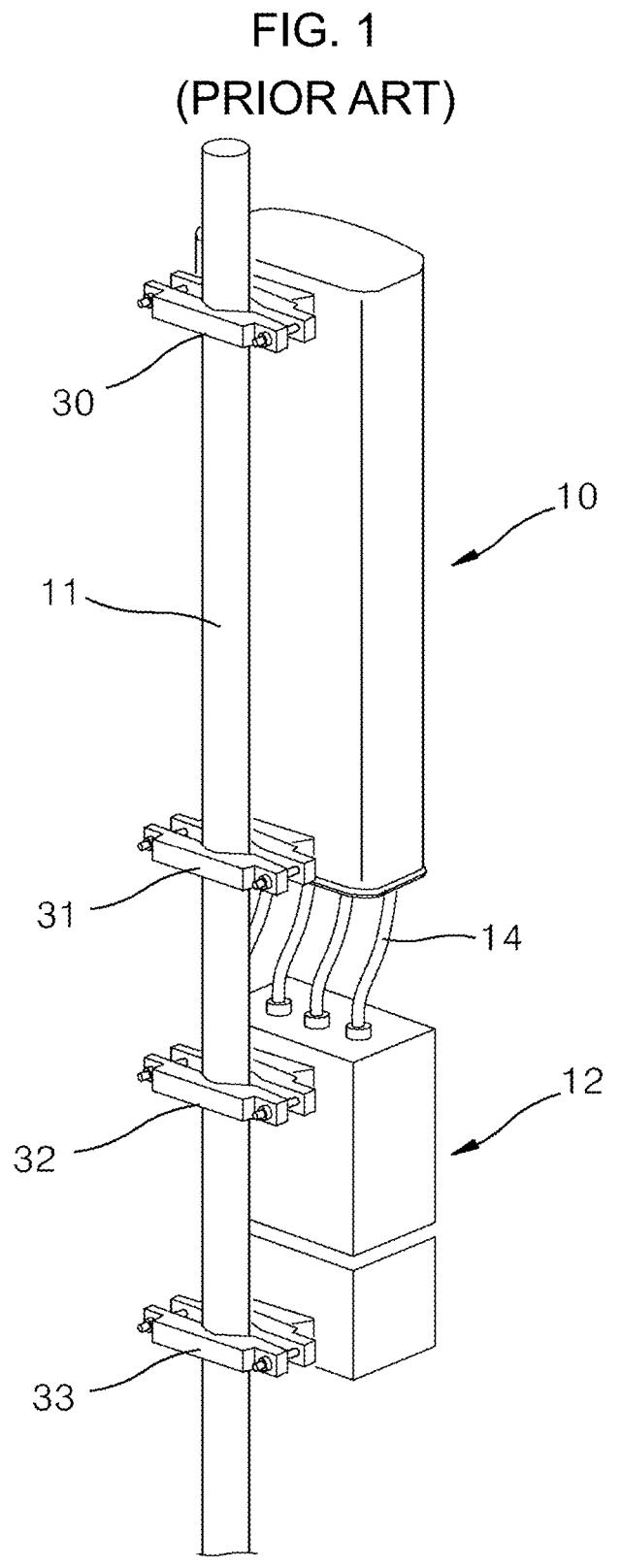

FIG. 1 is a perspective view illustrating an external appearance of an antenna apparatus for a base station according to a conventional embodiment.

As illustrated in FIG. 1, the antenna apparatus for a base station according to the conventional embodiment is installed in the outdoor (outside), and has a structure in which an antenna module 10 is mounted on an upright support pole 11 by fixing brackets 30 and 31, a radio unit 12 is mounted on the lower side of the antenna module 10 by fixing brackets 32 and 33, and the antenna module 10 and the radio unit 12 are electrically connected by using a plurality of cables 14. The fixing brackets 30 and 31 have a structure in which the fixing brackets are disposed at upper and lower parts of the antenna module 10, respectively, and are fixed to the support pole 11, and are disposed at upper and lower parts of the radio unit 12, respectively, and are fixed to the support pole 11. The fixing brackets 30 and 33 are each responsible for fixing by using a fastening tool, for example, a screw, a bolt, or a nut.

However, the conventional antenna apparatus for a base station has a problem in that it degrades a fine view due to the cables 14 being exposed to the outside because the conventional antenna apparatus has a structure that is limited to outdoor (outside) installation essentially through the medium of the support pole 11 and has a structure in which the antenna module 10 is mounted on a relatively upper side of the support pole 11, the radio unit 12, for example, a remote radio head (RRH) is mounted on a relatively lower side thereof, and the antenna module and the radio unit are then connected by using the cables 14.

If a small cell base station is installed indoors as described above, there is a problem in that the beauty of appearance is degraded due to a complicated connection of cables between a radio unit (RRH) and an antenna module. Furthermore, there is a problem in that the covering of a dual band frequency band is practically difficult because only one antenna module is included in each radio unit (RRH).

DISCLOSURE

Technical Problem

The present disclosure has been contrived to solve the technical problems, and an object of the present disclosure is to provide a small cell base station antenna apparatus, which facilitates the construction of a small cell base station at places, such as public places, densely populated areas, and large shopping malls or airport buildings.

Furthermore, another object of the present disclosure is to provide a small cell base station antenna apparatus capable of preventing a fine view (the beauty of appearance) from being degraded by being provided to be capable of adjusting its directivity even without exposing various cables that electrically connect a radio unit and an antenna module to the outside.

Furthermore, still another object of the present disclosure is to provide a small cell base station antenna apparatus capable of a dual band at various places by being provided to cover a different frequency band by partitioning a part of one antenna module or to cover different frequency bands of a plurality of antenna modules.

Furthermore, yet another object of the present disclosure is to provide a small cell base station antenna apparatus capable of widely securing a directivity adjustment angle by each multi-function link that mediates the installation of the plurality of antenna modules for a radio unit.

Technical objects of the present disclosure are not limited to the aforementioned objects, and the other objects not described above may be evidently understood from the following description by those skilled in the art.

Technical Solution

An antenna apparatus for a base station according to an embodiment of the present disclosure includes a radio unit (RU), at least one antenna module installed to be capable of tilting and steering operations with respect to the radio unit, and a multi-function link configured to mediate an installation of each antenna module in the radio unit. The multi-function link includes male connectors electrically connected to female connectors included in the antenna module and the radio unit.

In this case, the multi-function link may further include a fixing part having one side opened and fixed to the radio unit and a ball joint part having a part accommodated in and coupled to an internal space of the fixing part and configured to adjust a directivity of the antenna module by a tilting or steering operation. The male connector may be connected to one end and the other end of each of a plurality of coaxial cables accommodated within the fixing part and the ball joint part.

Furthermore, the multi-function link may further include a cable accommodation pipe having one end connected to the radio unit and the other end connected to the fixing part and configured to conceal the plurality of coaxial cables from the outside by accommodating the plurality of coaxial cables.

Furthermore, the male connector may include a male terminal block connected to the one end and other end of the coaxial cable and a plurality of terminal pins configured to extend from the coaxial cable and configured to protrude and extend from the male terminal block to the female connector.

Furthermore, the male connector may further include a plurality of guide pins configured to protrude from the male terminal block to the female connector and a retainer nut configured to retain an electrical connection force of the plurality of terminal pins with respect to the female connector.

Furthermore, the retainer nut may retain the connection force by an operation of being fastened to a nut fastening stage included in the female connector.

Furthermore, the male connector may further include a guide ring configured to protrude toward the female connector in a ring type while surrounding the plurality of terminal pins and the plurality of guide pins.

Furthermore, the plurality of terminal pins and the plurality of guide pins may be formed to protrude in sizes in which the plurality of terminal pins and the plurality of guide pins are inserted into a plurality of terminal grooves and a plurality of guide grooves that are formed in the female connector.

Furthermore, a plurality of antenna sub-arrays that cover a dual frequency band may be arranged on one antenna board within the antenna module. The antenna module may implement antenna beamforming having different frequency bands in a direction identical with the direction of the antenna module, which is set by the multi-function link.

Furthermore, a plurality of antenna sub-arrays may be arranged to cover different frequency bands in the antenna module. The directivity of the antenna module may be set in a different direction by the multi-function link.

Furthermore, the antenna module may be provided for a small cell base station.

Furthermore, the radio unit may be installed at any one of a support pole, a wall, and a ceiling which are provided indoors.

A small cell base station antenna apparatus according to another embodiment of the present disclosure includes a radio unit (RU), at least one antenna module installed to be capable of tilting and steering operations with respect to the radio unit, and a multi-function link configured to mediate an installation of each antenna module in the radio unit. The multi-function link includes a center body, a first fixing part connected between one of both ends of the center body and the antenna module, a second fixing part connected between the other of the both ends of the center body and the radio unit, a first ball joint part having a part of any one of both ends accommodated in and coupled to an internal space of the first fixing part, having the other of the both ends connected to the antenna module, and configured to adjust the directivity of the antenna module by a tilting or steering operation, and a second ball joint part having a part of any one of both ends accommodated in and coupled to an internal space of the second fixing part, having the other of the both ends connected to a cable accommodation pipe that mediates a connection with the radio unit, and configured to additionally adjust the directivity of the antenna module.

In this case, the multi-function link may further include male connectors electrically connected to female connectors included in the antenna module and the radio unit.

Furthermore, male connectors electrically connected to female connectors included in the antenna module and the cable accommodation pipe may be further included.

Furthermore, the male connectors may be connected to one end and the other end of each of a plurality of coaxial cables that are accommodated within the first ball joint part, the first fixing part, the center body, the second fixing part, and the second ball joint part.

Furthermore, the male connectors may be connected to one end and the other end of each of a plurality of coaxial cables that are accommodated within the first ball joint part, the first fixing part, the center body, the second fixing part, the second ball joint part, and the cable accommodation pipe.

Furthermore, fixed cables having a number corresponding to the plurality of coaxial cables may be accommodated within the cable accommodation pipe that is connected to the second ball joint part. A one-side cable connector formed to have a structure identical with the structure of the female connector may be provided at one end of the cable accommodation pipe that is connected to the plurality of coaxial cables. The other-side cable connector formed to have a structure identical with the structure of the male connector may be provided at the other end of the cable accommodation pipe that is connected to the radio unit.

Furthermore, the cable accommodation pipe may conceal the plurality of coaxial cables from the outside by accommodating the plurality of coaxial cables, have one end connected to the radio unit, and have the other end connected to the fixing part. The male connector may be connected to one end and the other end of the coaxial cable.

Furthermore, the male connector may include a male terminal block connected to one end and the other end of each of the plurality of coaxial cables, a plurality of guide pins configured to protrude from the male terminal block to the female connector, a plurality of terminal pins configured to extend from the coaxial cable and to protrude and extend from the male terminal block to the female connector, and a retainer nut configured to retain an electrical connection force of the plurality of terminal pins with respect to the female connector.

Furthermore, the multi-function link may further include an over-rotation trapping part configured to prevent over-rotation of the first ball joint part or the second ball joint part with respect to the first fixing part or the second fixing part.

Furthermore, the over-rotation trapping part may include a pair of trapping protrusions included in the first fixing part and the second fixing part, fixed to an internal space between the first fixing part and the first ball joint part or between the second fixing part and the second ball joint part, and configured to protrude in a direction in which the pair of trapping protrusions face each other within the internal space and a pair of trapping plates included in the first ball joint part and the second ball joint part and extended and formed toward the center body so that the pair of trapping plates is engaged with the pair of trapping protrusions at least within a rotation radius thereof.

Advantageous Effects

According to the antenna apparatus for a base station according to an embodiment of the present disclosure, the following various effects can be derived.

First, there is an effect in that the construction of a small cell base station is easy because the directivity of the antenna module is easily adjusted even at a narrow space by using the multi-function link.

Second, there is an effect in that a fine view (the beauty of appearance) can be prevented from being degraded because the directivity can be adjusted even without exposing various cables that electrically connect the radio unit and the antenna module to the outside.

Third, there is an effect in that the directivity adjustment angles of a plurality of antenna modules for the radio unit can be widely secured because the angle of the multi-function link can be adjusted through the ball joint part at two places at both ends of the center body.

DESCRIPTION OF DRAWINGS

FIG. 1 is a perspective view illustrating an external appearance of an antenna apparatus for a base station according to a conventional embodiment.

FIG. 2 is a perspective view illustrating an external appearance of a small cell base station antenna apparatus according to an embodiment of the present disclosure.

FIG. 3 is an exploded perspective view of FIG. 2.

FIG. 4 is a front view of FIG. 2 and is a cross-sectional view taken along line A-A.

FIG. 5 is a side cross-sectional view of FIG. 2.

FIG. 6 is a side view illustrating a tilting form of an antenna module, among the components of FIG. 2.

FIG. 7 is a perspective view illustrating an embodiment in which a radio unit, among the components of FIG. 2, has different specifications.

FIG. 8 is a conceptual view illustrating a beamforming form by two frequency bands of CBRS and DoD within one antenna module.

FIG. 9 is a plan view of a real antenna apparatus of FIG. 8.

FIGS. 10A and 10B are front views illustrating various implementation examples of a support pole coupling type and a wall coupling type as implementation examples of a dual frequency band for each antenna module.

FIG. 11 is a perspective view illustrating an external appearance of a small cell base station antenna apparatus (the support pole coupling type) according to a first embodiment of the present disclosure.

FIG. 12 is a perspective view illustrating an external appearance of a small cell base station antenna apparatus (the wall coupling type) according to a second embodiment of the present disclosure.

FIG. 13 is a perspective view illustrating an external appearance of a small cell base station antenna apparatus (a ceiling coupling type) according to a third embodiment of the present disclosure.

FIGS. 14 and 15 are perspective views of a short type (a) and long type (b) of a multi-function link for connecting a radio unit and an antenna module and cutaway perspective views (a) and (b) thereof.

FIG. 16 is a cross-sectional view taken along line B-B in FIG. 10.

FIG. 17 is an exploded perspective view illustrating the long type (b) multi-function link, among the multi-function links of FIGS. 14 and 15.

FIG. 18 is a perspective view illustrating a small cell base station antenna apparatus to which a modified example of a multi-function link has been applied.

FIGS. 19A and 19B are exploded perspective views of a front side and rear side of FIG. 18.

FIG. 20 is an exploded perspective view of a multi-function link according to a modified example of FIG. 18.

FIG. 21 is a cross-sectional view illustrating a female and male coupling portion of the multi-function link according to the modified example of FIG. 18.

FIG. 22 is a cross-sectional view of the multi-function link according to the modified example of FIG. 18.

FIG. 23 is a cross-sectional view illustrating a male connector of the multi-function link according to the modified example of FIG. 18.

FIG. 24 is an exploded perspective view of the multi-function link according to the modified example of FIG. 18.

FIG. 25 is a cutaway perspective view of FIG. 24.

FIG. 26 is a cross-sectional view of FIG. 24.

FIG. 27 is a cutaway perspective view illustrating an over-rotation trapping part that is referred in FIGS. 24 to 26.

FIG. 28 is an internal front view illustrating an operating form of the over-rotation trapping part of FIG. 27.

FIG. 29 is a cross-sectional view, cutaway perspective view, and a partially enlarged view illustrating a cable accommodation pipe, among the components of the multi-function link according to the modified example of FIG. 18.

FIG. 30 is a projective plan view for describing an acting effect of the multi-function link according to the modified example of FIG. 18.

DESCRIPTION OF REFERENCE NUMERALS

| | |
|---|---|
| 100: base station antenna apparatus | 110: antenna module |
| 111: antenna housing | 113: radome |
| 115: antenna board | 117: patch element |
| 118: antenna sub-array | 119: radiation element module |
| 120: radio unit | 121: installation panel part |
| 122: rear housing | 123: front housing |
| 150: female connector | 151: female terminal block |
| 152: guide groove | 153: terminal groove |
| 154: ring accommodation groove | 155: alien substance introduction prevention ring |

-continued

| | |
|---|---|
| 200: multi-function link | 205: center body |
| 200': multi-function link of modified example | 210: fixing part |
| 210A: first fixing part | 210B: second fixing part |
| 217: assembly screw | 220: ball joint part |
| 220A: first ball joint part | 220B: second ball joint part |
| 225: moving lock part | 230: cable accommodation pipe |
| 240: coaxial cable | 250: male connector |
| 251: male terminal block | 252: guide pin |
| 253: terminal pin | 254: guide ring |
| 256: retainer nut | 257: C-ring |

[Best Model]

Hereinafter, a small cell base station antenna apparatus according to various embodiments of the present disclosure are described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

In describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as having ideal or excessively formal meanings unless explicitly defined otherwise in the specification.

FIG. 2 is a perspective view illustrating an external appearance of a small cell base station antenna apparatus according to an embodiment of the present disclosure. FIG. 3 is an exploded perspective view of FIG. 2. FIG. 4 is a front view of FIG. 2 and is a cross-sectional view taken along line A-A. FIG. 5 is a side cross-sectional view of FIG. 2. FIG. 6 is a side view illustrating a tilting form of an antenna module, among the components of FIG. 2.

As referenced in FIG. 2 to FIG. 5, a small cell base station antenna apparatus 100 according to an embodiment of the present disclosure includes a radio unit 120 installed at a predetermined place and an antenna module 110. In this case, the predetermined place at which the small cell base station antenna apparatus 100 according to an embodiment of the present disclosure is installed means places, such as public places, densely populated areas, and large shopping malls or airport buildings, so that the small cell base station antenna apparatus performs a function as a small cell base station, and may be a structure that is suitable for in-building (indoor) installation, like a support pole coupling type (refer to FIG. 11 that is described later), a wall coupling type (refer to FIG. 12 that is described later), and a ceiling coupling type (refer to FIG. 13 that is described later), as will be described later.

The antenna module 110 may denote an antenna module having at least one frequency band. Furthermore, the radio unit (RU) 120 means an apparatus that is connected to an antenna for each frequency band provided to the antenna module 110 and that performs transmission/reception between the antenna and a base station. An example of the radio unit 120 may be a remote radio head (RRH), that is, a part of the radio unit which has been remotely separated from base station equipment. The radio unit 120 is a relay apparatus that performs functions for receiving a weakened signal and amplifying and retransmitting the signal between a base station of a mobile communication system and a mobile communication terminal, standardizing a distorted waveform, and adjusting timing again.

As referenced in FIG. 3, in the small cell base station antenna apparatus 100 according to an embodiment of the present disclosure, first, the radio unit 120 may be mounted on a structure, such as an indoor (house) support pole, a wall, or a ceiling. The antenna module 110 may be mounted on a front surface of the radio unit 120 in a way to be capable of tilting and steering through the medium of an antenna clamping unit 200 that is described later.

However, the radio unit 120 does not need to be first essentially mounted on an indoor structure (a support pole, a wall, and a ceiling) as referenced in FIGS. 2 to 5. As referenced in FIGS. 11 to 13 that are described later, after the antenna module 110 is first installed in the radio unit 120, the radio unit may be mounted on each indoor structure.

As referenced in FIG. 4, the antenna module 110 may include an antenna housing 111 and a radome 113 that is provided to cover a front surface of the antenna housing 111 and that forms a predetermined space between the radome and the antenna housing 111.

An antenna board 115 having a printed circuit board form may be installed in the predetermined space of the antenna housing 111. A plurality of radiation elements may be mounted and disposed on a front surface of the antenna board 115. The radiation elements that are mounted and disposed in the antenna board 115 may be different depending on the type of antenna. However, an embodiment of the present disclosure in which a patch type element (a patch element 117) has been adopted is described.

Meanwhile, the antenna apparatus 100 for a base station according to an embodiment of the present disclosure may further include a multi-function link 200 that mediates coupling with the front surface of the radio unit 120 as referenced in FIGS. 2 to 5.

More specifically, as referenced in FIGS. 2 to 5, the radio unit 120 includes a rear housing 122 that is installed in any one of a support pole P, a wall W, and a ceiling C which are provided indoors, through the medium of an installation panel part (refer to reference numeral "121" in FIG. 11 and subsequent drawings thereof) and a front housing 123 that forms a predetermined space between the front housing and the rear housing 122. Various internal components may be installed in the predetermined space.

The internal components that are installed within the radio unit 120 may include a main board, two power amplifying units (PAU), and a power supplying unit (PSU), although not illustrated.

A plurality of heat sink pins 125 may be integrally formed on a front surface of the front housing 123 of the radio unit 120. Heat generated in the predetermined space may be discharged to the outside through the plurality of heat sink pins 125. In the small cell base station antenna apparatus 100 according to an embodiment of the present disclosure, it has been limitedly described that the plurality of heat sink pins 125 are formed only in the front housing 123 of the radio unit 120, but the present disclosure is not essentially limited thereto. It is to be noted that the plurality of heat sink pins 125 may also be formed in the rear housing 122 as in other embodiments of the present disclosure that are described later.

Meanwhile, an installation groove part 127 from which some of the plurality of heat sink pins 125 have been removed in the form of surfaces of a quadrangle shape may be provided in the front surface of the front housing 123. The multi-function link 200 may be coupled to the installation groove part 127 by a plurality of assembly screws 217. However, the installation groove part 127 having a form in which the plurality of heat sink pins have been deleted in the form of the surfaces of the quadrangle shape does not need to be essentially provided in the front surface of the front housing 123 in order to install the multi-function link 200. As in embodiments 100A, 100B, and 100C referred in FIGS. 11 to 13 that are described later, the multi-function link 200 may be connected to a side portion (i.e., a concept including an upper part, a lower part, a left part, and a right part that form a front and rear thickness part) of the radio unit 120.

In this case, the multi-function link 200 may include a fixing part 210 that is provided in the form of cylinder having a part opened on one side thereof and that mediates a cable accommodation pipe 230 that is described later toward the other side thereof or that is directly connected to the radio unit 120 without the cable accommodation pipe 230 and a ball joint part 220 a part of one end of which is inserted and installed on the opened one side of the fixing part 210 and to the other end of which the antenna module 110 is coupled.

An embodiment in which the fixing part 210 is connected to the radio unit 120 through the medium of the cable accommodation pipe 230 is described later more specifically after a first embodiment to third embodiment of FIGS. 11 to 13 are described. In particular, it is preferred that the cable accommodation pipe 230 is made of a stiff material to the extent that the cable accommodation pipe 230 can partially perform the function of a support pole because the multi-function link 200 including the cable accommodation pipe 230 basically performs a function for mediating the connection of the antenna module 110 with the radio unit 120.

The ball joint part 220 that is accommodated and installed within formed the fixing part 210 is approximately in the form of a ball a part of one end of which has been opened, and may be installed to be trapped by the end of the opened one side of the fixing part 210 so that the ball joint part is not detached toward the outside (in particular, forward). In this case, the reason why a part of the one end of the ball joint part 220 is formed to be opened is to install a plurality of coaxial cables 240 that are described later through the ball joint part.

Furthermore, the ball joint part 220 has an inside emptied up to a portion installed in the fixing part 210 and a portion installed in the antenna module 110, and communicates with the internal space of the fixing part 210. The coaxial cable 240 that performs an electrical connection between the radio unit 120 and the antenna module 110 may be installed in the internal space in which the fixing part 210 and the ball joint part 220 communicate with each other.

In this case, it is preferred that the coaxial cable 240 is made of a flexible material which enables the antenna module 110 to perform tilting and steering operations that are described later, but which does not at least interfere with the moving of the ball joint part 220 with respect to the fixing part 210.

An antenna-side male connector (refer to reference numeral "250A" in FIG. 15 that is described later) and a radio unit-side male connector (refer to reference numeral "250B" in FIG. 15 that is described later) may be provided on one end and the other end of the coaxial cable 240, respectively. An antenna-side female connector (refer to reference numeral "150A" in FIG. 16 that is described later) and a radio unit-side female connector (refer to reference numeral "150B" in FIG. 16 that is described later), which will be to connected the antenna-side connector 250A or the radio unit-side connector 250B, may be provided on a rear surface of the antenna module 110 and on the outside of the radio unit 120, respectively. This is described more specifically later.

As described above, the small cell base station antenna apparatus 100 according to an embodiment of the present disclosure can prevent a fine view from being degraded because the plurality of coaxial cables 240 that electrically connect the radio unit 120 and the antenna module 110 are concealed from the outside without being twisted.

The ball joint part 220 may be subjected to tilting and steering operations so that the ball joint part can maintain a predetermined angle to the fixing part 210 in all directions including up and down directions or left and right directions. In this case, the term "tilting operation" is a concept including all operations of the top and bottom of the antenna module 110 swinging in forward and backward directions thereof. The term "steering operation" is a concept including all operations of the left end and right end of the antenna module 110 swinging in left and right directions thereof. In the small cell base station antenna apparatus 100 according to an embodiment of the present disclosure, the ball joint part 220 may be provided so that only any one of the tilting and steering operations of the antenna module 110 is not performed, but both the tilting operation and the steering operation are simultaneously performed.

More specifically, the ball joint part 220 may be subjected to the tilting and steering operations at a predetermined angle in all the directions including the up and down directions or the left and right directions, centering around an arbitrary reference point of one end of the ball joint part, which has been accommodated within the fixing part 210. As the ball joint part 220 is subjected to the tilting and steering operations, the antenna module 110 coupled to the ball joint part is also capable of the tilting and steering operations, and the directivity of the antenna module 110 can be adjusted in a desired direction of a designer.

In this case, the ball joint part 220 may be subjected to the tilting and steering operations while forming some frictional force with an internal surface of the fixing part 210. To this end, a friction pad (or a friction member not illustrated) that forms a predetermined frictional force therebetween may be further provided on a part of the internal surface of the fixing part 210 or a part of an inserted external surface of the ball joint part 220.

Meanwhile, as referenced in FIG. 5, the antenna clamping unit 200 may further include a moving lock part 225 that fixes the ball joint part 220 to the fixing part 210 at a moving fixing point after the ball joint part 220 is subjected to the tilting and steering operations at a predetermined angle to the fixing part 210.

Any means may be adopted as the moving lock part 225 if a component is means that fixes the ball joint part 220 to the fixing part 210. For example, locking may be implemented by a fixing bolt 219 that interferes with a part of an outer circumference surface of the ball joint part 220 through a fixing bolt through hole 218 that is formed to penetrate the outside of the fixing part 210 in which the ball joint part 220 has been accommodated. In this case, the fixing bolt 219 may be provided as a non-head bolt that is not exposed to the outside of the fixing bolt through hole 218, and can prevent the beauty of appearance from being degraded.

As described above, the small cell base station antenna apparatus 100 according to an embodiment of the present disclosure has advantages in that it can prevent a fine view from being degraded by sublating the external exposure of the plurality of coaxial cables 240 that connect the radio unit 120 and the antenna module 110 and can maximize space utilization by allowing only the antenna module 110 to perform the tilting and steering operations and preventing the tilting and steering operations of the radio unit 120 from being performed, through the multi-function link 200.

Furthermore, the small cell base station antenna apparatus 100 according to an embodiment of the present disclosure may provide an advantage in that customized directivity for dense population or a plurality of demand spaces can be adjusted regardless of its installation place including an indoor space or an outdoor space because the antenna module is installed in front of the radio unit 120 to be capable of the tilting and steering operations (only the tilting operation illustrated in FIG. 6) through the medium of the multi-function link 200, as referenced in FIG. 6.

FIG. 7 is a view illustrating an perspective embodiment in which the radio unit, among the components of FIG. 2, has different specifications. FIG. 8 is a conceptual view illustrating a beamforming form by two frequency bands of CBRS and DoD within one antenna module. FIG. 9 is a plan view of a real antenna apparatus of FIG. 8. FIGS. 10A and 10B are front views illustrating various implementation examples of a support pole coupling type and a wall coupling type as implementation examples of a dual frequency band for each antenna module.

As referenced in FIG. 7, the antenna module 110 has the same specifications to which patch antenna elements have been applied, but only the specifications of the radio unit 120 may be different. More specifically, compared to the radio unit 120 referred in FIGS. 2 to 6, the radio unit 120 referred in FIG. 7 may have specifications in which the width of the radio unit in left and right directions is relatively small, but the length of the radio unit in up and down directions is relatively great. In this case, it is preferred that the location at which the antenna module 110 is installed is set as a proper location by considering the weight and tilting and steering operations of the antenna module 110.

However, in the small cell base station antenna apparatus 100 according to an embodiment of the present disclosure, only the specifications of the radio unit 120 may not be essentially applied differently.

That is, as referenced in FIGS. 8 and 9, a radiation element module 119 in which a plurality of patch elements 117 for forming beamforming having a specific frequency band have been arranged to constitute a plurality of antenna sub-arrays 118 may be provided on a front surface of the antenna module 110.

The plurality of radiation element modules 119 each have a format for constructing a frequency band corresponding to a small cell base station, and may be implemented within one antenna module 110 in the form of an antenna board 115, but may be implemented in one antenna board 115 for macro so that the plurality of radiation element modules are divided in the form of a dual band for covering frequency bands corresponding to Depart of Defense (DoD) and Citizens Broadband Radio Services (CBRS), as referenced in FIGS. 8 and 9.

More specifically, as referenced in FIGS. 8 and 9, in the plurality of radiation element modules 119, the plurality of antenna sub-arrays 118 by the plurality of patch elements 117 are arranged to implement a gain of 17.5 dBi by implementing a DoD channel having a frequency band of 3450 to 3550 MHZ of the dual frequency band on the front surface of the antenna board 115 for macro. The plurality of antenna sub-arrays 118 by the plurality of patch elements 117 may be arranged to implement a gain of 15.5 dBi by implementing a CBRS channel having a frequency band of 3550 to 3700 MHz of the dual frequency band below the front surface of the antenna board 115 for macro.

The plurality of radiation element modules 119 that are constructed to cover the dual frequency band as described above may form antenna beamforming so that the H-beam widths of both the DoD and CBRS channels each have a value of 55° to 90° and may form different antenna beamforming so that the V-Beam width of the DoD channel has a value of 7.5° and the V-Beam width of the CBRS channel has a value of 14.6°, as referenced in FIG. 8.

That is, the antenna module 110 may be implemented to form antenna beamforming that covers a frequency band for macro and a frequency band for a small cell within one antenna board 115 as described above. Furthermore, although the directivity of the antenna module 110 is identically adjusted, there is an advantage in that uplink (UL) coverage according to the separation of TRx for each band and the antenna sub-array 118 can be maximized.

However, the antenna sub-arrays 118 do not need to be essentially arranged in one antenna board 115 so that the dual frequency band can be covered. It is reasonable that the antenna sub-arrays may be implemented so that two or more antenna modules 110A and 110B capable of covering unique frequency bands, respectively, are included in one radio unit 120 that is described later through the medium of the multi-function link 200 and the directivity of each of the antenna modules 110A and 110B is adjusted by using the multi-function link 200 in a direction in which a coverage requirement value is strong, as referenced in FIGS. 10A and 10B.

For example, as in (a) of FIG. 10A provided in the support pole coupling type and (a) of FIG. 10B provided in the wall coupling type, the directivities of the antenna modules 110A and 110B provided in the form of two dual frequency bands, respectively, may be adjusted in the same direction (front). As in (b) of FIG. 10A provided in the support pole coupling type and (b) of FIG. 10B provided in the wall coupling type, the directivities of both the antenna modules 110A and 110B may be adjusted in opposite directions to each other or to the left and the right, respectively. As in (c) of FIG. 10A provided in the support pole coupling type and (c) of FIG. 10B provided in the wall coupling type, the directivity of one 110A of the antenna modules 110A and 110B may be adjusted to the front, and the directivity of the other 110B thereof may be adjusted to the side.

In this case, the radiation element modules 119 of each of the modules have antenna 110A and 110B specifications that are suitable for a small cell base station not for macro, but have specifications on which the antenna module can achieve a maximum gain rate of any one of 15 dBi, 13 dBi, and 11 dBi so that the directivity of the antenna module can be adjusted in a desired direction. Accordingly, it is reasonable that the effect of the small cell base station can be maximized.

FIG. 11 is a perspective view illustrating an external appearance of a small cell base station antenna apparatus (the support pole coupling type) according to a first embodiment of the present disclosure. FIG. 12 is a perspective view illustrating an external appearance of a small cell base station antenna apparatus (the wall coupling type) according to a second embodiment of the present disclosure. FIG. 13 is a perspective view illustrating an external appearance of a small cell base station antenna apparatus (the ceiling coupling type) according to a third embodiment of the present disclosure. FIGS. 14 and 15 are perspective views of a short type (a) and long type (b) of the multi-function link for connecting the radio unit and the antenna module and cutaway perspective views (a) and (b) thereof. FIG. 16 is a cross-sectional view taken along line B-B in FIG. 10. FIG. 17 is an exploded perspective view illustrating the long type (b) of the multi-function link, among the multi-function links of FIGS. 14 and 15.

In the small cell base station antenna apparatus 100 according to an embodiment of the present disclosure, as referenced in FIGS. 11 to 13, the rear housing 122 of the radio unit 120 may be fixed to any one of the indoor support pole P, wall W, and ceiling C or may be concealed and installed therein through the medium of the installation panel part 121 and at least one (two in the present embodiment) antenna modules 110A and 110B may be coupled to the radio unit 120 through the medium of the multi-function link 200 in a way to be tilted or steered.

Referring to FIG. 11, a support pole P for installing the base station antenna apparatus 100 according to the present embodiment may be provided within a large-sized building, etc. The small cell base station antenna apparatus 100A according to the first embodiment of the present disclosure may be installed and provided in the support pole coupling type in which the rear housing 122 corresponding to the rear part of the radio unit 120 may be fixed to the support pole P so that directivity is preset.

For example, the rear housing 122 of the radio unit 120 is coupled to the support pole P through the medium of the installation panel part 121. In this case, after the rear housing is firmly fixed so that the directivity is adjusted in a coverage-required direction, detailed directivity may be adjusted through the medium of the multi-function link 200 that is described later.

Furthermore, referring to FIG. 12, the small cell base station antenna apparatus 100B according to the second embodiment of the present disclosure may be installed and provided in the wall coupling type in which the rear housing 122 corresponding to the rear part of the radio unit 120 may be fixed to the wall W corresponding to the indoor of a large-sized building, etc. so that the rear housing 122 is closely attached to the wall.

In this case, the small cell base station antenna apparatus may be formed to have a structure in which the installation panel part 121 does not need to be coupled to the rear housing 122 and the installation panel part is previously installed and fixed to the wall W before being coupled to the rear housing 122 or the front housing 123 and then the radio unit 120 is held in the installation panel part 121.

Furthermore, referring to FIG. 13, the small cell base station antenna apparatus 100C according to the third embodiment of the present disclosure may be installed and provided in the ceiling coupling type in which the rear housing 122 corresponding to the rear part of the radio unit 120 is closely attached to and fixed to the ceiling C within a large-sized building, etc. or the radio unit 120 may be concealed and fixed within the ceiling C.

However, although not illustrated in the drawings, the radio unit 120 does not need to be essentially installed under the ceiling C or a ceiling surface through the medium of the installation panel part 121. It is reasonable that the radio unit may be fixed to a separate support pole that is installed in the ceiling C.

In this case, the radio unit 120 and each of the antenna modules 110A and 110B may be electrically signally connected through the medium of the multi-function link 200 that is appropriately adopted as any one of a short type multi-function link (hereinafter abbreviated a "short type link 200S") or a long type multi-function link (hereinafter abbreviated as a "long type link 200L") that are referred in FIGS. 14 and 15, depending on different surrounding environments, such as an installed place, interference with a surrounding component for adjusting the directivity of the antenna module 110A, 110B.

As referenced in (a) and (b) of FIGS. 14 and 15, the short type link 200S and the long type link 200L have specifications having the fully same construction and function, and may be distinguished depending on whether the length of the cable accommodation pipe 230 in which the plurality of coaxial cables 240 are accommodated is relatively short or long. In general, the length of the cable accommodation pipe 230 means a separation distance between a portion where the cable accommodation pipe is connected to the radio unit 120 and the fixing part 210 of the multi-function link 200. It is preferred that the long type link 200L is provided when the separation distance is great. It is preferred that the short type link 200S is provided when the separation distance is small.

Referring to FIGS. 14 to 17, in the small cell base station antenna apparatus 100 according to an embodiment of the present disclosure, the multi-function link 200 may include the fixing part 210, the ball joint part 220, the cable accommodation pipe 230, and the plurality of coaxial cables 240.

Furthermore, the multi-function link 200 is provided at the ends of the plurality of coaxial cables 240. The antenna-side male connector 250, 250A for an electrical connection with the antenna module 110 may be further provided at one end of the plurality of coaxial cables 240. The radio unit-side male connector 250, 250B for an electrical connection with the radio unit 120 may be further provided at the other end of the plurality of coaxial cables 240.

As referenced in FIG. 15, the antenna-side male connector 250A may be provided so that a guide pin 252 and a terminal pin 253 each having a male form, which are described later, are exposed at the antenna-side end of the ball joint part 220. As referenced in FIG. 15, the radio unit-side male connector 250B may also be provided so that the guide pin 252 and the terminal pin 253 each having a male form, which are described later, are exposed at the end of the cable accommodation pipe 230.

Hereinafter, the antenna-side male connector 250A and the radio unit-side male connector 250B are collectively referred to and described as the "male connector 250" because only locations where the antenna-side male connector and radio unit-side male connector are installed are different from each other and the antenna-side male connector and the radio unit-side male connector have the same basic construction.

Furthermore, the antenna module 110 and the radio unit 120 may further include the antenna-side female connector 150, 150A and the radio unit-side female connector 150, 150B each for a connection with the male connector 250.

As referenced in FIGS. 11 to 13 and 15, the antenna-side female connector 150A may be provided so that a guide groove 152 and a terminal groove 153 each having a female form, which are described later, are exposed on the rear surface of the antenna module 110. The radio unit-side female connector 150B may also be provided so that the guide groove 152 and the terminal groove 153 each having a female form, which are described later, are exposed on a side part of the radio unit 120.

Hereinafter, the antenna-side female connector 150A and the radio unit-side female connector 150B are collectively referred to and described as the "female connector 150" because only locations where the antenna-side female connector and the radio unit-side female connector are installed are different from each other and the antenna-side female connector and the radio unit-side female connector have the same basic construction.

Four coaxial cables 240 are each provided to transmit an electrical signal and are accommodated within the cable accommodation pipe 230, and each have one end and the other end connected to the male connector 250.

The male connector 250 may further include a male terminal block 251 to which one end of each of the four coaxial cables 240 is coupled and that mediates the four coaxial cables so that the four coaxial cables are connected to the plurality of terminal pins 252, respectively. The female connector 150 may further include the female terminal block 151 in which the guide groove 152 and the terminal groove 153 have been processed and formed.

Four guide pins 252 are disposed to protrude in the male terminal block 251 so that the four guide pins are spaced apart from each other at intervals of 90°, and may be disposed to protrude so that the four guide pins are spaced apart from each other at intervals of 90° within a range in which the four terminal pins 253 do not overlap the four guide pins 252.

Furthermore, four guide grooves 152 into which four guide pins 252 of the male terminal block 251 may be inserted and accommodated, respectively, and four terminal grooves 153 into which four terminal pins 253 of the male terminal block 251 may be inserted and connected, respectively, may be disposed in the female terminal block 151 at locations at which the four guide grooves and the four terminal grooves correspond to each other.

Furthermore, the male terminal block 251 may further include a guide ring 254 that protrudes toward the female connector 150 in a ring type, while surrounding the four guide pins 252 and the four terminal pins 253. Furthermore, the female terminal block 151 may further include a ring accommodation groove 154 into which the guide ring 254 of the male terminal block 251 is inserted. In this case, an alien substance introduction prevention ring 155 for preventing the introduction of an external alien substance may be further included within the ring accommodation groove 154.

The four guide pins 252, the guide ring 254, and the four terminal pins 253, which are included in the male connector 250, are inserted into the four guide grooves 152, the ring accommodation groove 154, and the four terminal grooves 153, which are included in the female connector 150, respectively, so that the electrical connection of the multi-function link 200 with the antenna module 110 and the radio unit 120 may be performed.

Meanwhile, as referenced in FIGS. 15 to 17, the multi-function link 200 may further include a retainer nut 256 that provides a predetermined retention force so that an electrical connection between the male connector 250 and the female connector 150 is maintained.

The predetermined retention force may be formed because a female thread 256a is formed in an inner circumferential surface of the retainer nut 256 and the female thread 256a of the retainer nut 256 is fastened to a male thread 156a that is formed in an outer circumference surface of a nut fastening stage 156 formed in an outer circumference surface of the female terminal block 151 of the female connector 150.

In this case, a C-ring 257 may be interposed at the end of the male terminal block 151 so that the fastening force of the retainer nut 256 is limited.

As described above, the small cell base station antenna apparatus 100 according to an embodiment of the present disclosure provides advantages in that an electrical connection between the radio unit 120 and the plurality of antenna modules 110 is performed through the medium of the multi-function link 200, the tilting or steering operation of each antenna module 110 is made possible, and installation work is possible more simply and conveniently on the spot. In particular, the four coaxial cables 240 are accommodated, concealed, and arranged within the fixing part 210, the ball joint part 220, and the cable accommodation pipe 230 so that the four coaxial cables are not monitored from the outside. There is provided an advantage in that the beauty of appearance can be prevented from being degraded.

Moreover, as the male connector 250 and the female connector 150 are formed to be symmetrical to each other, there can be provided an advantage in that the diversity of the directivity design of the antenna module 110 can be further increased if the four terminal pins 253 and the four terminal grooves 153 have only to be connected in any direction.

FIG. 18 is a perspective view illustrating a small cell base station antenna apparatus to which a modified example of a multi-function link has been applied. FIGS. 19A and 19B are exploded perspective views of a front side and rear side of FIG. 18. FIG. 20 is an exploded perspective view of a multi-function link according to a modified example of FIG. 18.

As referenced in FIGS. 18 to 20, the small cell base station antenna apparatus 100 according to an embodiment of the present disclosure may include a multi-function link 200' according to the modified example.

Unlike in the multi-function link 200 (hereinafter referred to as the "common multi-function link") described with reference to FIGS. 5 to 7 and 11 to 17, in the multi-function link 200' according to the modified example, the fixing part 210 may be separated into two fixing parts 210A and 210B, a center body 205 may be disposed between the two fixing parts 210A and 210B, and the two fixing parts 210A and 210B may be orthogonally coupled to the center body 205, as referenced in FIG. 18.

Hereinafter, for convenience of description, a fixing part that is connected to the part of the antenna module 110, among the two fixing parts 210A and 210B, is referred to as a first fixing part 210A. A fixing part that is connected to the part of the cable accommodation pipe 230, among the two fixing parts 210A and 210B, is referred to as a second fixing part 210B.

That is, the multi-function link 200' according to the modified example is different from the common multi-function link 200 in which the common multi-function link includes only the fixing part 210 and the ball joint part 220 connected to the part of the antenna module 110 and the directivity of the antenna module 110 for tilting and steering can be adjusted only at one place, in that the second fixing part 210B and a second ball joint part 220B that mediate additional connections are included on the part of the cable accommodation pipe 230 in addition to the first fixing part 210A and a first ball joint part 220A that connect the antenna module 110.

More specifically, as referenced in FIGS. 18 to 20, the multi-function link 200' according to the modified example may include the center body 205, the first fixing part 210A connected between one of both ends of the center body 205 and the antenna module 110, the second fixing part 210B connected between the other of both ends of the center body 205 and the cable accommodation pipe 230, a first ball joint part 220A a part of any one of both ends of which is accommodated and coupled to an internal space of the first fixing part 210A and the other of the both ends thereof is connected to the antenna module 110 and which adjusts the directivity of the antenna module 110 by a tilting or steering operation, and a second ball joint part 220B a part of any one of both ends of which is accommodated and coupled to an internal space of the second fixing part 210B and the other of the both ends thereof is connected to the cable accommodation pipe 230 that mediates a connection with the radio unit 120 so that the directivity of the antenna module 110 can be additionally adjusted.

FIG. 21 is a cross-sectional view illustrating a female and male coupling portion of the multi-function link according to the modified example of FIG. 18. FIG. 22 is a cross-sectional view of the multi-function link according to the modified example of FIG. 18. FIG. 23 is a cross-sectional view illustrating a male connector of the multi-function link according to the modified example of FIG. 18. FIG. 24 is an exploded perspective view of the multi-function link according to the modified example of FIG. 18. FIG. 25 is a cutaway perspective view of FIG. 24. FIG. 26 is a cross-sectional view of FIG. 24. FIG. 27 is a cutaway perspective view illustrating an over-rotation trapping part that is referred in FIGS. 24 to 26. FIG. 28 is an internal front view illustrating an operating form of the over-rotation trapping part of FIG. 27. FIG. 29 is a cross-sectional view, a cutaway perspective view, and a partially enlarged view illustrating a cable accommodation pipe, among the components of the multi-function link according to the modified example of FIG. 18.

In the multi-function link 200' according to the modified example, as referenced in FIG. 21, a male connector 250 that is provided at the end of the first ball joint part 220A or the second ball joint part 220B may be coupled to a female connector 150 that is included in the antenna module 110 or the radio unit 120 by a male and female coupling operation.

More specifically, as a guide ring 254 of the male connector 250 is accommodated within a ring accommodation groove 154 formed in the female terminal block 151 of the female connector 150, the guide ring comes into contact with an alien substance introduction prevention ring 155 interposed within the ring accommodation groove 154 so that water proofing is performed. Simultaneously, a guide pin 252 and terminal pin 253 of the male connector 250 are inserted into the guide groove 152 and terminal groove 153 of the female connector 150 and are electrically connected thereto.

In this case, as referenced in FIG. 21, a ground washer 258 may be further provided between the female connector 150 and the male connector 250. The ground washer 258 is fixed to a washer installation groove (refer to reference numeral "258h" in FIG. 25) that is provided in a front end surface of a male terminal block 251 of the male connector 250, and may perform a ground (GND) function by inducing a contact between the male terminal block 251 of the male connector 250 and the female terminal block 151 of the female connector 150 upon female and male coupling of the male connector 250 with the female connector 150.

A part of the male terminal block 251 of the male connector 250 may be inserted and fixed to the front end part side of the first ball joint part 220A or the second ball joint part 220B.

In this case, the male connector 250 may be fixed to the first ball joint part 220A or the second ball joint part 220B through the medium of at least one non-head bolt 259 so that the male connector is not rotated with respect to the first ball joint part or the second ball joint part.

More specifically, as referenced in FIGS. 22 to 24, bolt through holes 259h-1 may be formed at two places of the front part of the first ball joint part 220A or the second ball joint part 220B so that the bolt through holes are spaced apart from each other at an interval of 180°. Bolt fastening holes 259h-2 to each of which the non-head bolt 259 is fastened may be formed in an outer circumference surface of the male terminal block 251 of the male connector 250 so that the bolt fastening hole corresponds to the bolt through hole.

A tool groove 259T into which the front end of a fastening tool (not illustrated) having a rectangular cross section is inserted may be formed on the outside of the non-head bolt 259. The male connector 250 can be conveniently fixed by using a fastening tool through the tool groove 259T so that the non-head bolt 259 is not exposed to the outside.

As described above, as the male connector 250 is inserted and fixed to the front part of the first ball joint part 220A or the second ball joint part 220B and trapped in a rotation direction thereof by the non-head bolt 259, a change in the direction in which the terminal pin 253 or the guide pin 252 is coupled to the terminal groove 153 or guide groove 152 of the female connector 150 can be prevented because the arbitrary rotation of the male connector 250 with respect to the first ball joint part 220A or the second ball joint part 220B is prevented.

Meanwhile, when the electrical connection of the male connector 250 with the female connector 150 is completed as described above in the state in which the retainer nut 256 has been previously inserted and temporarily assembled with an outer circumference surface of the first ball joint part 220A or the second ball joint part 220B, the retainer nut 256 may be firmly fixed by fastening the retainer nut to a male thread (reference numeral not indicated) formed in the outer circumference surface of the female terminal block 151 of the female connector 150.

In this case, if a C-ring fastening groove 257h is formed in the outer circumference surface of the first ball joint part 220A or the second ball joint part 220B and the C-ring 257 is fastened to the C-ring fastening groove 257h, damage to a part attributable to the over-assembly of the retainer nut 256 can be prevented because a rotator force is limited when the retainer nut 256 is fastened.

Meanwhile, as referenced in FIGS. 25 to 28, the multi-function link 200' according to the modified example may further include an over-rotation trapping part 226A that prevents the over-rotation of the first ball joint part 220A or the second ball joint part 220B with respect to the first fixing part 210A or the second fixing part 210B.

The over-rotation trapping part 226A includes a pair of trapping protrusions 226A-1 that are included in the first fixing part 210A and the second fixing part 210B and fixed to an internal space between the first fixing part 210A and the first ball joint part 220A or between the second fixing part 210B and the second ball joint part 220B and that protrude in a direction in which the pair of trapping protrusions face each other in the internal space. That is, the pair of trapping protrusions 226A-1 may be included in the over-rotation trapping part 226A so that the pair of trapping protrusions is spaced apart from each other approximately in a 180° direction, and may be extended toward the internal space by a predetermined length.

Meanwhile, a pair of trapping plates 228 that is included in the first ball joint part 220A or the second ball joint part 220B and that extends toward the center body 205 so that the pair of trapping plates is engaged with the pair of trapping protrusions 226A-1 at least within a rotation radius thereof may be formed.

As referenced in FIG. 28, if a tilting or steering rotation operation is not performed, the pair of trapping plates 228 of the first ball joint part 220A or the second ball joint part 220B is disposed so that a separation angle between each of the pair of trapping plates and each of the pair of trapping protrusions 226A-1 in a rotation direction thereof becomes 90° (refer to (a) in FIG. 28). When the first ball joint part 220A or the second ball joint part 220B is rotated in one direction or the other direction for a tilting or steering rotation operation, the rotation angle of the first ball joint part or the second ball joint part in each direction can be limited to a maximum of 90°.

This is for preventing a phenomenon in which the plurality of coaxial cables 240 within the internal space are twisted due to the excessive rotation of the first ball joint part 220A or the second ball joint part 220B.

The first ball joint part 220A is coupled to the female connector 150 of the antenna module 110 through the medium of the male connector 250. The second ball joint part 220B is coupled to the top of the cable accommodation pipe 230 that is vertically disposed up and down through the medium of the male connector 250. If the over-rotation trapping part 226A is not provided, the left and right steering rotation angle of the antenna module 110 is theoretically 360° and is not limited thereto.

However, the rotation angle of the second ball joint part 220B to the top of the cable accommodation pipe 230 is limited to 90° by the over-rotation trapping part 226A. The second ball joint part may be limited to be rotated up to 90° in addition to a physical maximum rotation restriction angle "a" of the second ball joint part 220B, which is described later, in directions on one side and the other side thereof. For example, when the maximum rotation restriction angle "a" that is described later is 40°, a maximum steering rotation angle of the antenna module 110 is limited every 130° in directions on one side or the other side thereof.

Meanwhile, as referenced in FIG. 29, the cable accommodation pipe 230, among the components of the multi-function link 200' according to the modified example, may include a one-side cable connector 230A and the other-side cable connector 230B that are formed to have the same structures as the male connector 250 and the female connector 150 formed at both ends thereof, respectively. Fixed cables 240' may be accommodated within the cable accommodation pipe 230 between the one-side cable connector 230A and the other-side cable connector 230B.

That is, the plurality of fixed cables 240' fixed within the cable accommodation pipe 230 are provided in the state in which the plurality of fixed cables have been fixed without being moved, differently from the plurality of coaxial cables 240 provided on the outside of the cable accommodation pipe 230. The one-side cable connector 230A having the same structure as the female connector 150 may be provided at one end of the cable accommodation pipe 230 so that the one-side cable connector is connected to the male connector

250 that is exposed to the outside of the second ball joint part 220B. The other-side cable connector 230B having the same structure as the male connector 250 may be provided at the other end of the cable accommodation pipe 230 so that the other-side cable connector is connected to the female connector 150B of the radio unit 110.

Accordingly, like the female connector 150, a plurality of terminal grooves 233A, a plurality of guide grooves (not illustrated), and a ring accommodation groove 234A may be formed in the one-side cable connector 230A of the cable accommodation pipe 230. A male thread 231A-s to which the retainer nut 256 is fastened may be formed in an outer circumference surface of the female terminal block 231A. Furthermore, an alien substance introduction prevention ring 235A may be interposed within the ring accommodation groove 234A.

Furthermore, like the male connector 250, a plurality of terminal pins 233B, a plurality of guide pins 232B, and a guide ring 234B may be formed in the other-side cable connector 230B of the cable accommodation pipe 230. A ground washer 238B may be provided in a central portion of the plurality of terminal pins 233B. Furthermore, a C-ring fastening groove 237B-h in which a C-ring 237B for preventing the retainer nut 256 of the radio unit 120 from being excessively assembled is installed may be formed in an outer circumference surface of the male terminal block 231B.

In this case, unlike the coaxial cables 240 that are installed within the center body 205, the first fixing part 210A, the second fixing part 210B, the first ball joint part 220A, and the second ball joint part 220B and that are made of a flexible material so that the coaxial cables are moved in conjunction with a tilting or steering rotation operation of the antenna module 110, the plurality of coaxial cables 240 may be made of a rigid material because the plurality of coaxial cables do not need to be moved within the cable accommodation pipe 230 or may be firmly fixed so that the plurality of coaxial cables are not moved within the cable accommodation pipe 230.

Furthermore, in order to distinguish between installation directions, a portion that is coupled to the male connector 250 of the second ball joint part 220B at both ends of the cable accommodation pipe 230 may include the one-side cable connector 230A having a female connector form, and a portion that is coupled to the female connector 150 of the radio unit 120 at the both ends may include the other-side cable connector 230B having a male connector form.

FIG. 30 is a projective plan view for describing an acting effect of the multi-function link according to the modified example of FIG. 18.

As referenced in FIG. 30, the multi-function link 200' constructed as described above according to the modified example increases the amount of a tilting or steering operation of the antenna module 110 so that the directivity of the antenna module 110 can be additionally adjusted, compared to the common multi-function link 200.

More specifically, in general, two coaxial cables 240 may be provided and accommodated within the cable accommodation pipe 230 if the antenna module 110 constructs a transmission channel for 2T2R. Four coaxial cables may be provided and accommodated within the cable accommodation pipe if the antenna module 110 constructs a transmission channel for 4T4R.

In this case, according to the common multi-function link 200, after the cable accommodation pipe 230 is fixed to the female connector 150 of the antenna module 110 by using the male connector 250, when the antenna module 110 is subjected to a steering operation in an arrow direction (including both one direction and the other direction), the common multi-function link has limitation in that it can rotate for the steering operation only within the range of the maximum rotation angle "a" of the ball joint part 220 in left and right horizontal directions thereof.

In particular, if two coaxial cables 240 are accommodated within the cable accommodation pipe 230, although not illustrated in the drawing, the terminal groove 153 and the terminal pin 253 within the female connector 150 and the male connector 250 for the electrical connection of the two coaxial cables 240 with the radio unit 120 are formed in a 3 o'clock direction and a 9 o'clock direction, respectively, on the basis of the ground. It is impossible to adjust the directivity of the antenna module 110 through a steering operation of 90° or more in one direction or the other direction. This is because the direction in which the two coaxial cables 240 are connected to the female connector 150 of the radio unit 120 has been preset to the 3 o'clock direction and the 9 o'clock direction.

For this reason, if the two coaxial cables 240 are included, it is impossible to set the directivity of the antenna module 110 as the direction of 90° in the left and right directions thereof with respect to the front surface of the radio unit 120 within a range in which the maximum rotation angle "a" in the left and right horizontal directions does not become 90° in the left direction or the right direction (likewise, it is impossible when the female connector 150 and the male connector 250 are assembled again by changing the location where the terminal pin 253 is connected to the terminal groove 153 after the female connector and the male connector are separated). In order to enable the setting of the directivity of the antenna module, the female connector and the male connector need to be essentially assembled again so that the location where the terminal groove 153 of the female connector 150 coupled to the radio unit 120 is installed is changed. Even in this case, there is limitation in that the setting of the 90° directivity in any one direction is impossible.

However, such limitation is reduced if four coaxial cables 240 are accommodated within the cable accommodation pipe 230. The reason for this is that the terminal grooves 153 and the terminal pins 253 within the female connector 150 and the male connector 250 for the electrical connections of the four coaxial cables 240 with the radio unit 120 are formed to be spaced apart from each other in the direction of 90° in a circumferential direction thereof at four places, as referenced in FIG. 30. In this case, even without the separation and reassembly process of the female connector 150 from and to the radio unit 120, after the connection between the female connector 150 and the male connector 250 is simply released, the directivity for the front surface of the radio unit 120 can be adjusted in the left and right 90° directions by a process of connecting the female connector and the male connector again suitably for the terminal pin 253 and the terminal groove 153 the directivity design of which is possible in a desired direction of a designer.

In contrast, the multi-function link 200' according to the modified example includes the first fixing part 210A, the first ball joint part 220A, the second fixing part 210B, and the second ball joint part 220B so that they are orthogonal to both ends of the center body 205. Even in the embodiment in which the two coaxial cables 240 are accommodated within the cable accommodation pipe 230, when the directivity of the antenna module 110 is adjusted by rotating the antenna module in the direction on one side or the other side thereof by a steering operation, the limitation of the maximum restriction steering angle "a" disappears by the second fixing part 210B and the second ball joint part 220B that are provided to be capable of a 360° steering operation on the basis of a vertical axis thereof, among the two fixing parts 210A and 210B and the two ball joint parts 220A and 220B. Accordingly, the directivity of the antenna module for all the directions of 360 degrees can be adjusted even without the separation and recoupling process of the female connector 150 from and to the radio unit 120. However, although the rotation of the second ball joint part 220B with respect to the second fixing part 210B is limited to 90° by the over-rotation trapping part 226A as described above, the limitation of the rotation of the antenna module 110 in the direction on one side or the other side thereof may lead to the same results in that the limitation of the rotation is expanded every 90° in addition to the maximum restriction steering angle "a".

That is, in the multi-function link 200' according to the modified example, the restriction range of the steering operation of the antenna module 110 on the basis of the radio unit 120 is removed due to the addition of the second fixing part 210B and the second ball joint part 220B. Although the adjustment of the directivity of the antenna module is newly set, the separation and recoupling process of the female connector 150 from and to the radio unit 120 is not required, and the directivity of the antenna module 110 can be easily adjusted on the spot.

For reference, even upon tilting operation of the antenna module 110, likewise, the antenna module may have a maximum tilting restriction angle in up and down directions thereof as referred in reference numeral "a" in FIG. 30. An advantage in that the maximum tilting restriction angle "a" of the antenna module 110 that is coupled through the medium of the multi-function link 200' according to the modified example is increased by 2a, that is, two times the maximum tilting restriction angle, because the two fixing parts 210A and 210B and the two ball joint parts 220A and 220B are included at both ends of the center body 205 can be created.

As described above, the small cell base station antenna apparatus 100 according to the embodiments of the present disclosure has been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the small cell base station antenna apparatus, which facilitates the construction of a small cell base station at places, such as public places, densely populated areas, and large shopping malls or airport buildings, prevents a fine view (the beauty of appearance) from being degraded because the small cell base station antenna apparatus is provided to be capable of adjusting directivity even without exposing various cables that electrically connect the radio unit and the antenna module to the outside, enables a dual band at various places because a part of one antenna module is partitioned to cover a different frequency band or a plurality of antenna modules are provided to cover different frequency band, and can widely secure a directivity adjustment angle by each multi-function link that mediates the installation of a plurality of antenna modules with respect to the radio unit.

The invention claimed is:

1. A small cell base station antenna apparatus comprising:
a radio unit (RU);
at least one antenna module installed to be capable of tilting and steering operations with respect to the radio unit; and
a multi-function link configured to mediate an installation of each antenna module in the radio unit,
wherein the multi-function link comprises male connectors electrically connected to female connectors included in the antenna module and the radio unit.

2. The small cell base station antenna apparatus according to claim 1, wherein the multi-function link further comprises:
a fixing part having one side opened and fixed to the radio unit; and
a ball joint part having a part accommodated in and coupled to an internal space of the fixing part and configured to adjust a directivity of the antenna module by a tilting or steering operation,
wherein the male connector is connected to one end and another end of each of a plurality of coaxial cables accommodated within the fixing part and the ball joint part.

3. The small cell base station antenna apparatus according to claim 2, wherein the multi-function link further comprises a cable accommodation pipe having one end connected to the radio unit and the other end connected to the fixing part and configured to conceal the plurality of coaxial cables from an outside by accommodating the plurality of coaxial cables.

4. The small cell base station antenna apparatus according to claim 2, wherein the male connector comprises:
a male terminal block connected to the one end and other end of each of the plurality of coaxial cables; and
a plurality of terminal pins configured to extend from the plurality of coaxial cables and configured to protrude and extend from the male terminal block to the female connector.

5. The small cell base station antenna apparatus according to claim 4, wherein the male connector further comprises:
a plurality of guide pins configured to protrude from the male terminal block to the female connector; and
a retainer nut configured to retain an electrical connection force of the plurality of terminal pins with respect to the female connector.

6. The small cell base station antenna apparatus according to claim 5, wherein the retainer nut retains the connection force by an operation of being fastened to a nut fastening stage included in the female connector.

7. The small cell base station antenna apparatus according to claim 5, wherein the male connector further comprises a guide ring configured to protrude toward the female connector in a ring type while surrounding the plurality of terminal pins and the plurality of guide pins.

8. The small cell base station antenna apparatus according to claim 7, wherein the plurality of terminal pins and the plurality of guide pins are sized for insertion into a plurality of terminal grooves and a plurality of guide grooves formed in the female connector.

9. The small cell base station antenna apparatus according to claim 1, wherein:
a plurality of antenna sub-arrays that cover a dual frequency band are arranged on one antenna board within the antenna module, and the antenna module implements antenna beamforming having different frequency bands in a direction identical with a direction of the antenna module, which is set by the multi-function link.

10. The small cell base station antenna apparatus according to claim 1, wherein:
a plurality of antenna sub-arrays are arranged to cover different frequency bands in the antenna module, and
a directivity of the antenna module is set in a different direction by the multi-function link.

11. The small cell base station antenna apparatus according to claim 1, wherein the antenna module is provided for a small cell base station.

12. The small cell base station antenna apparatus according to claim 1, wherein the radio unit is installed at any one of a support pole, a wall, and a ceiling which are provided indoors.

13. A small cell base station antenna apparatus comprising:
a radio unit (RU);
at least one antenna module installed to be capable of tilting and steering operations with respect to the radio unit; and
a multi-function link configured to mediate an installation of each antenna module in the radio unit,
wherein the multi-function link comprises:
a center body;
a first fixing part connected between one of both ends of the center body and the antenna module;
a second fixing part connected between the other of the both ends of the center body and the radio unit;
a first ball joint part having a part of any one of both ends accommodated in and coupled to an internal space of the first fixing part, having the other of the both ends connected to the antenna module, and configured to adjust a directivity of the antenna module by a tilting or steering operation; and
a second ball joint part having a part of any one of both ends accommodated in and coupled to an internal space of the second fixing part, having the other of the both ends connected to a cable accommodation pipe that mediates a connection with the radio unit, and configured to additionally adjust the directivity of the antenna module.

14. The small cell base station antenna apparatus according to claim 13, wherein the multi-function link further comprises male connectors electrically connected to female connectors included in the antenna module and the radio unit.

15. The small cell base station antenna apparatus according to claim 13, wherein the multi-function link further comprises male connectors electrically connected to female connectors included in the antenna module and the cable accommodation pipe.

16. The small cell base station antenna apparatus according to claim 15, wherein the male connectors are connected to one end and another end of each of a plurality of coaxial cables that are accommodated within the first ball joint part, the first fixing part, the center body, the second fixing part, and the second ball joint part.

17. The small cell base station antenna apparatus according to claim 14, wherein the male connectors are connected to one end and another end of each of a plurality of coaxial cables that are accommodated within the first ball joint part, the first fixing part, the center body, the second fixing part, the second ball joint part, and the cable accommodation pipe.

18. The small cell base station antenna apparatus according to claim 16, wherein:

fixed cables having a number corresponding to the plurality of coaxial cables are accommodated within the cable accommodation pipe that is connected to the second ball joint part, a one-side cable connector formed to have a structure identical with a structure of the female connector is provided at one end of the cable accommodation pipe that is connected to the plurality of coaxial cables, and an other-side cable connector formed to have a structure identical with a structure of the male connector is provided at the other end of the cable accommodation pipe that is connected to the radio unit.

19. The small cell base station antenna apparatus according to claim 17, wherein:

the cable accommodation pipe conceals the plurality of coaxial cables from an outside by accommodating the plurality of coaxial cables, has one end connected to the radio unit, and has the other end connected to the second ball joint part of the second fixing part, and the male connector is connected to one end and another end of each of the plurality of coaxial cables.

20. The small cell base station antenna apparatus according to claim 16, wherein the male connector comprises:

a male terminal block connected to one end and another end of each of the plurality of coaxial cables;

a plurality of guide pins configured to protrude from the male terminal block to the female connector;

a plurality of terminal pins configured to extend from the plurality of coaxial cables and to protrude and extend from the male terminal block to the female connector; and a retainer nut configured to retain an electrical connection force of the plurality of terminal pins with respect to the female connector.

21. The small cell base station antenna apparatus according to claim 13, wherein the multi-function link further comprises an over-rotation trapping part configured to prevent over-rotation of the first ball joint part or the second ball joint part with respect to the first fixing part or the second fixing part.

22. The small cell base station antenna apparatus according to claim 21, wherein the over-rotation trapping part comprises:

a pair of trapping protrusions included in the first fixing part and the second fixing part, fixed to an internal space between the first fixing part and the first ball joint part or between the second fixing part and the second ball joint part, and configured to protrude in a direction in which the pair of trapping protrusions face each other within the internal space; and a pair of trapping plates included in the first ball joint part and the second ball joint part and extended and formed toward the center body so that the pair of trapping plates is engaged with the pair of trapping protrusions at least within a rotation radius thereof.

* * * * *